United States Patent [19]

Choi et al.

[11] Patent Number: 5,653,821
[45] Date of Patent: Aug. 5, 1997

[54] METHOD FOR MANUFACTURING ORIENTED ELECTRICAL STEEL SHEET BY HEATING SLAB AT LOW TEMPERATURE

[75] Inventors: Gyu Seung Choi; Chung San Lee; Jong Soo Woo; Byung Deug Hong, all of Kyong Sang Book-Do, Rep. of Korea

[73] Assignees: Pohang Iron & Steel Co., Ltd.; Research Institute of Industrial Science & Technology, both of Pohang, Rep. of Korea

[21] Appl. No.: 481,353

[22] PCT Filed: Nov. 9, 1994

[86] PCT No.: PCT/KR94/00160

§ 371 Date: Jul. 7, 1995

§ 102(e) Date: Jul. 7, 1995

[87] PCT Pub. No.: WO95/13401

PCT Pub. Date: May 18, 1995

[30] Foreign Application Priority Data

| Nov. 9, 1993 | [KR] | Rep. of Korea | 1993/23751 |
| Aug. 29, 1994 | [KR] | Rep. of Korea | 1994/21388 |
| Aug. 29, 1994 | [KR] | Rep. of Korea | 1994/21389 |
| Aug. 29, 1994 | [KR] | Rep. of Korea | 1994/21390 |
| Aug. 29, 1994 | [KR] | Rep. of Korea | 1994/21391 |

[51] Int. Cl.⁶ ............................................. H01F 1/04
[52] U.S. Cl. ............................................. 148/111; 148/113
[58] Field of Search ............................................. 148/111, 113

[56] References Cited

U.S. PATENT DOCUMENTS

| 4,623,407 | 11/1986 | Suga et al. | 148/111 |
| 4,692,193 | 9/1987 | Yoshitomi et al. | 148/111 |
| 5,507,883 | 4/1996 | Tanaka et al. | 148/113 |
| 5,512,110 | 4/1996 | Yoshitomi et al. | 148/113 |

FOREIGN PATENT DOCUMENTS

| 57-158322 | 9/1982 | Japan | C21D 8/12 |
| 59-056522 | 4/1984 | Japan | C21D 8/12 |
| 01230721 | 9/1989 | Japan | C21D 8/12 |
| 01283324 | 11/1989 | Japan | C21D 8/12 |
| 03294427 | 12/1991 | Japan | C21D 8/12 |
| 04173923 | 6/1992 | Japan | C21D 8/12 |
| 04235222 | 8/1992 | Japan | C21D 8/12 |
| 6-17137 | 1/1994 | Japan | 148/113 |

*Primary Examiner*—John Sheehan
*Attorney, Agent, or Firm*—Webb Ziesenheim Bruening Logsdon Orkin & Hanson, P.C.

[57] ABSTRACT

A method for manufacturing an oriented electrical steel sheet includes the step of preparing a steel slab composed of in weight %: 0.035–0.050% of C, 2.9–3.3% of Si, less than 0.016% of P, 0.011–0.017% of soluble Al, 0.0080–0.012% of N, less than 0.007% of S, 0.06–0.18% of Ni+Cr, less than 0.32% of Mn with an Mn/S ratio of 20 or more, less than 0.6% of Cu with a Cu/Mn ratio of 1.5 or more, and balance of Fe and other inevitable impurities. The steel slab is heated at a temperature of 1250°–1320° C., and then hot rolled. The hot rolled slab is then cold rolled in two stages to a final sheet thickness, with a decarburization annealing being carried out at an intermediate thickness. The decarburized cold rolled sheet is coated with an annealing separator containing MgO as the main ingredient and then a finish annealing treatment is conducted, thereby obtaining a magnetically superior oriented electrical steel sheet.

12 Claims, 3 Drawing Sheets

METHOD FOR MANUFACTURING ORIENTED ELECTRICAL STEEL SHEET BY HEATING SLAB AT LOW TEMPERATURE

FIELD OF THE INVENTION

The present invention relates to an oriented electrical steel sheet for use as steel cores in transformers, electric motors, electric generators and other electric and electronic apparatuses. Particularly, the present invention relates to an oriented electrical steel sheet in which a steel slab composed of a particular composition is heated at a temperature lower than the conventional level, then a hot rolling is carried out, and then, a stabilization stage is undergone through a secondary recrystallization, whereby the oriented electrical steel sheet is made to have superior magnetic properties.

BACKGROUND OF THE INVENTION

The oriented electrical steel sheet has a texture in which the crystal grains have (110)[001] orientations. This product has extremely superior magnetic properties in the rolling direction, and by utilizing these properties, the product is used in transformers, electric motors, electric generators and other electric and electronic apparatuses as steel cores. This (110)[001] texture is obtained through a secondary recrystallization, and the secondary recrystallization grains are formed in such a manner that particularly oriented nuclei, i.e., nuclei having a (110)[001] orientation among the fine primary recrystallization grains are abnormally grown throughout the entire test piece. If such a secondary recrystallization having the particular orientation are to be promoted, the growth of the primary recrystallization grains has to be inhibited, and, for this purpose, precipitates of MnS, AlN and BN are used.

The oriented electrical steel sheet can be classified into two kinds based on the magnetic properties. The first is the conventional oriented electrical steel sheet which was almost perfected in 1960's, since Armco Company of the United States began industrial production from the early 1940's. This oriented electrical steel sheet shows a deviation of about 7° of the orientation [001] relative to the rolling direction, while its magnetic flux density is about 1.80–1.86 Tesla at B10. The second kind is that which was developed by NSC company of Japan in 1970's, and this oriented electrical steel sheet shows a far more superior magnetic properties than the first kind. That is, the magnetic flux density is over 1.89 Tesla at B10, and the orientation [001] shows a deviation of only 3°.

Generally, the oriented electrical steel sheet is manufactured in the following manner. Generally, the steel slab contains 2–4% of silicon, and also contains grain growth inhibitors such as MnS, MnSe, and AlN. Then the steel slab undergoes complicated process steps: reheating and hot rolling - preliminary annealing first cold rolling - intermediate annealing - second cold rolling - decarburization annealing - coating of an annealing separator -final finish annealing - tension coating treatment. This is a first method, and a second method is carried out in the following manner. That is, first a preliminary annealing is carried out, then one-stage of strong rolling is carried out to the final thickness, and then, a decarburization annealing is carried out.

In the complicated manufacturing process for the oriented electrical steel sheet, the most difficult process step is the reheating step in which the steel slab is subjected to a high temperature heat treatment. In carrying out this steel slab reheating step, the precipitates of MnS or AlN are made to be finely precipitated after solid-solution spreading. In order to achieve this, it is unavoidable that the slab has to be heated to as high as 1400° C., and has to be maintained at this temperature for 5 hours. Under this condition, the slab surface is reacted with the air, and consequently, there is formed an oxide called faylite ($2FeO \cdot SiO_2$) which is a composite material composed of Si oxides and Fe oxides. This oxide has a melting point as low as 1300° C., and therefore, its melt flows down along the surface of the slab. This oxide melt is designed to flow down to the outside, but a part of it is accumulated within the refractory material of the upper portion of the furnace. Therefore, upon completion of the slab reheating step, the interior of the furnace has to be repaired. Therefore, in a steel plant in which a continuous working is required, the work efficiency is lowered, the productivity is lowered, and the manufacturing cost is increased. Therefore, if it is possible to reheat the slab only to 1250°–1280° C. which is the heating condition for the ordinary steel, then the interference to the general steels can be eliminated, as well as obtaining other advantages. This will be a great advantage.

The lowering of the slab reheating temperature is intensively researched by many steel manufacturing companies, and many methods have been proposed. Most of the proposals aim at ensuring that the required magnetic properties are obtained by reheating the steel slab up to below the highest slab non-melting temperature (1300°–1320° C.) in principle.

Most of the proposals are focused on adjusting the basic composition, and on selecting a proper grain growth inhibitor which contributes to the formation of the secondary recrystallization of the (110)[001] orientation. In addition to the adjustment of the basic composition, the precipitate managing techniques are also proposed.

These proposals are found in Japanese Patent Laid-open No. Hei-1-230721, Hei-1-283324, Hei-4-235222, hei-4-173923, hei-3-294427, Sho-59-56522, and sho-59-190325.

All of them provides an oriented electrical steel sheet showing a flux density of over 1.89 Tesla at B10. The target slab reheating temperature is below 1200° C., and usually the slab is heated only up to 1150° C. Further, in order to ensure a high magnetic flux density, the N ingredient which is a grain growth inhibitor is supplemented during the process. For this, there is added the nitrogenizing treatment to infuse nitrogen into the slab after carrying out the decarburization annealing. Therefore, in these techniques, the slab reheating is carried out at a temperature lower than 1250°–1280° C. which is the heating temperature for the ordinary steel. Therefore, there occur interferences, and an additional facility for the nitrogenizing treatment has to be built, thereby increasing the manufacturing cost. Further, in spite of the low reheating temperature, one-stage of a strong rolling is adopted for ensuring a strong grain growth inhibiting force, and therefore, the process control becomes difficult, with the result that severe differences between different lots are generated, thereby lowering the actual yield. Therefore, this low temperature heating method can be applied to only the expensive product.

Meanwhile, ALSCO Company of the United States reported that an electrical steel sheet can be manufactured by properly controlling the Mn/S ratio based on the low temperature reheating condition of Japanese Patent Laid-open No. Sho-57-158322. However, in this method, the control of the grain growth inhibition strength is difficult, and therefore, stable magnetic properties cannot be obtained.

SUMMARY OF THE INVENTION

It is an object of the present invention to provide a method for manufacturing an improved oriented electrical steel sheet in which the steel composition is designed so as to heat the steel slab at 1250°–1320° C. and to carry out a hot rolling, the preliminary annealing is omitted so as make it possible to carry out the process even without additional facility and so as to stably form the secondary recrystallization of the (110)[001] orientation by securing a stable grain growth inhibiting strength, and a decarburization annealing is carried out at an intermediate thickness, thereby lowering the processing energy at the final rolling, and obtaining stable magnetic properties. It is another object of the present invention to provide a method for manufacturing an oriented electrical steel sheet, in which the heating rate is properly controlled during the final annealing so as to control the primary recrystallization grains to a fine scale, and so as to secure a driving force for the secondary recrystallization, so that the intermediate recovery annealing after the final cold rolling can be omitted, and that magnetic properties equivalent to those of the usual oriented electrical steel sheet or more can be ensured.

It is still another object of the present invention to provide a method for manufacturing an oriented electrical steel sheet, in which the atmosphere for the intermediate recovering annealing is humid unlike the conventional dry one so as for oxides to be formed, and the annealing temperature is raised up so as to be advantageous for the formation of oxides, so that intermediate annealing conditions optimally suitable for the formation of glass coating can be provided, thereby obtaining an oriented electrical steel sheet having a superior glass film characteristics and superior magnetic properties.

It is still another object of the present invention to provide a method for manufacturing an oriented electrical steel sheet, in which the Al content is increased for maintaining the necessary strong grain growth inhibiting strength, the precipitates in the intermediate process is optimally controlled, and the heating for the finish annealing as the final recrystallization forming step is strictly controlled, thereby obtaining a high magnetic flux density oriented electrical steel sheet showing more than 1.89 Tesla at B10.

It is still another object of the present invention to provide a method for manufacturing an oriented electrical steel sheet, in which, although it is somewhat departed from the intended composition, in order to satisfy the desire of the steel manufacturing plant to produce products, a composition having a low soluble Al content is initially used in carrying out the process at the same process conditions, but notwithstanding, the optimum balance between Al and N in the melt is maintained by controlling the atmospheric gas during the raising of the temperature for the final annealing, so that AlN precipitates can be secured so as to be advantageous for the final secondary recrystallization, thereby obtaining an oriented electrical steel sheet having superior lengthwise magnetic properties compared with those of the general composition.

In manufacturing the oriented electrical steel sheet, the composition includes in weight %: 0.035–0.050% of C, 2.9–3.3% of Si, less than 0.015% of P, 0.011–0.017% of soluble Al, 0.008–0.012% of N, less than 0.007% of S, 0.06–0.18% of Ni and/or Cr, less than 0.32% of Mn, less than 0.6% of Cu, balance of Fe, and other inevitable impurities. Then, a slab which is composed as described above, and in which the Mn/S weight ratio is more than 20.0, and in which the Cu/Mn weight ratio is more than 1.5 is heated to a temperature range of 1250°–1320° C.

Then a hot rolling is carried out, and then, two-stage of cold rolling containing a carburization annealing is carried out to a final thickness. Then an intermediate annealing is carried out, and there is coated an annealing separator containing MgO as the main ingredient. Then a finish annealing is carried out, thereby obtaining an oriented electrical steel sheet having superior magnetic properties.

Further, in another aspect of the present invention, in carrying out the manufacturing method of the present invention, the intermediate annealing is omitted, and instead, during the final annealing, the heating rate in the temperature range of 400°–700° C. is maintained at below 50° C./hr, thereby obtaining the oriented electrical steel sheet.

Further, in still another aspect of the present invention, in carrying out the manufacturing method of the present invention, the intermediate recovery annealing is carried out for 45 seconds to 2 minutes at a temperature of 600°–750° C. under a humid atmosphere with a $P_{H2O}/P_{H2}$ ratio of 0.62–0.88, thereby obtaining an oriented electrical steel sheet having a superior glass film characteristics.

Further, in still another aspect of the present invention, in carrying out the manufacturing method of the present invention, during the finish annealing, the heating rate in the temperature range of 400°–700° C. is maintained over 20° C./hr, thereby obtaining an oriented electrical steel sheet.

Further, in still another aspect of the present invention, in manufacturing the oriented electrical steel sheet of the present invention, the composition includes in weight %: 0.020–0.050% of C, 2.9–3.3% of Si, less than 0.016% of P, 0.018–0.030% of soluble Al, 0.0080–0.012% of N, less than 0.007% of S, 0.06–0.18% of Ni and/or Cr, less than 0.32% of Mn, less than 0.6% of Cu, balance of Fe and other inevitable impurities. A steel slab composed as described above is reheated at a temperature of 1250°–1320° C., and a hot rolling is carried out. Then without carrying out a hot-rolled sheet annealing, two-stage of cold rolling containing an intermediate decarburization annealing are carried out to the final thickness. Then an intermediate recovery annealing is carried out, and then, an annealing separator containing MgO as the basic ingredient is coated. During the finish annealing, the heating rate in the temperature range of 400°–700° C. is maintained at over 25° C./hr, thereby obtaining an oriented electrical steel sheet having high magnetic flux densities.

In still another aspect of the present invention, the manufacturing method of the present invention is carried out in such a manner that the intermediate annealing is omitted, and instead, during the final finish annealing, the heating rate in the temperature range of 400°–700° C. is maintained at below 50° C./hr, thereby obtaining an oriented electrical steel sheet.

In still another aspect of the present invention, in carrying out the method for manufacturing an oriented electrical steel sheet according to the present invention, the steel composition includes in weight %: 0.020–0.050% of C, 2.9–3.3% of Si, lees than 0.016% of P, 0.007–0.012% of soluble Al 0.0080–0.012% of N, less than 0.007% of S, 0.06–0.18% of Ni and/or Cr, less than 0.32% of Mn, less than 0.6% of Cu, and balance of Fe and other inevitable impurities. A steel slab composed as described above is reheated to a temperature of 1250°–1320° C., and a hot rolling is carried out. Then, without carrying out a hot rolled sheet annealing, two-stage of cold rolling containing an intermediate decarburization annealing are carried out to the final thickness. Then an intermediate recovery annealing is carried out, and an annealing separator containing MgO as the basic ingredient is coated. Then the steel sheet is maintained at a temperature of 1150°–1200° C. for 10 hours under a hydrogen atmosphere containing 100% of hydrogen or 10% or less of nitrogen, thereby carrying out a finish annealing. Thus there is obtained an oriented electrical steel sheet having stable magnetic properties.

In still another aspect of the present invention, the intermediate recovery annealing is omitted, and instead, during the finishing annealing, the heating rate in the temperature range of 400°–700° C. is maintained at below 50° C./hr, thereby obtaining an oriented electrical steel sheet.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
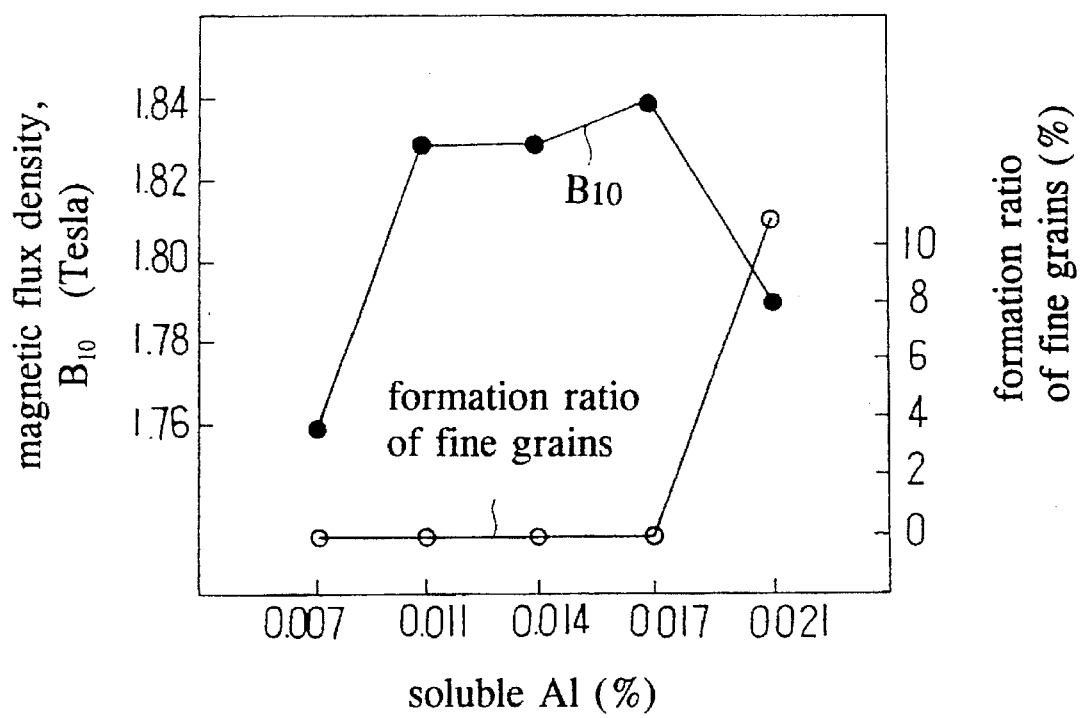
FIG. 1 is a graphical illustration showing the magnetic flux density $B_{10}$ and the formation ratio of fine grains among the secondary recrystallization grains versus the variation of the amount of soluble Al.

The basic conception of the present invention is that a new manufacturing process is secured for designing a composition system allowing a low temperature slab heating and enabling the control of an optimum grain growth inhibitor.

In one embodiment of the present invention, the basic grain growth inhibitor is AlN, and the auxiliary ones are $Cu_2S$ and MnS. Further, in the present invention, the precipitation of MnS which is used in the usual high temperature slab heating is inhibited as much as possible. For this purpose, the content of S is limited to less then 0.007% which is the minimum amount to control.

The present inventors observed the behaviors of the precipitates, and found the following facts. That is, the solid solution temperature for MnS is about 1280° C., and the next is AlN, while that for $Cu_2S$ is 1200° C. Further, the precipitating temperature for MnS during the hot rolling is 1200° C., but that for AlN is lower than that temperature, while that for $Cu_2S$ is as low as 1100° C.

Therefore,, when carrying out a hot rolling based on the high temperature heating of the slab, MnS is first precipitated at the high temperature, and then, AlN is precipitated. When AlN is precipitated, the MnS precipitates exist within the steel, and therefore, a co-precipitation phenomenon occurs in which AlN is precipitated around MnS. Therefore, the AlN precipitates are influenced by the MnS precipitates, with the result that the AlN precipitates becomes large and non-uniform. Therefore, although the amount is large, the amount of the actually acting proper sized grain growth inhibitor becomes insufficient.

Therefore, in the present invention, the AlN which is more advantageous for the low temperature slab heating is used as the grain growth inhibitor, and thus, the S which is inevitably exists is made to be precipitated in the form of $Cu_2S$. Thus the AlN which is formed during the cooling after a hot rolling is not influenced by MnS, with the result that AlN forms precipitates having fine and uniform sizes so as for it to be effective for inhibiting the grain growth.

The present invention is different from the conventional method for manufacturing high magnetic flux density oriented electrical steel sheet in which the Al content is 0.023–0.028%, and in which only one-stage of cold rolling is carried out with a high reduction rate of 85–90%, thereby requiring a strong grain growth inhibiting strength. The present invention lowers the Al content to 0.011–0.017%, and two-stage of rolling is carried out, so that the secondary recrystallization would be facilitated. Therefore, in the present invention, though the magnetic flux density is somewhat low, the differences of the magnetic properties between the products are very small and the magnetic properties are uniform between the products.

Meanwhile, if a high magnetic flux density oriented electrical steel sheet is to be produced, it is necessary that a large amount of precipitates (grain growth inhibitor) having fine and uniform sizes is distributed, so that a strong inhibiting strength can be secured. For this purpose, it was confirmed that the amount of soluble Al has to be increased, and the process conditions have to be optimized.

Therefore, if a high magnetic flux density oriented electrical steel sheet is to be manufactured according to the present invention, the amount of soluble Al should be limited to 0.018–0.030%.

Further, if the grain growth inhibitor is to be finely precipitated during the process to secure a strong inhibiting strength, then C has to be properly controlled. Further, in order to maintain a proper structure during the hot rolling, the amount of C should be somewhat high.

However, in order to secure the processing energy for the second reduction ratio and the decarburizability of the intermediate thickness, the lower range of C can be somewhat expanded.

The C ingredient forms the hot rolled structure, and provides the deformation energy for the cold rolling to contribute to the formation of the grain growth inhibitors. Therefore, this C ingredient is an important factor. However, in the low temperature reheating process of the present invention, the primary recrystallization occurs during the finish annealing, and there is no problem even if a small amount of the deformation energy is secured for the cold rolling. Therefore, expanding the lower limit of C is advantageous in view of the improvement of the decarburization of the intermediate thickness and under the metallurgical aspect.

Further, in the case where the amount of soluble Al is high, a large amount of precipitates exists, and therefore, due to a difference between the initial hot rolling temperature FTo and the final temperature FT6, the size and distribution are adversely affected, with the result that lengthwise magnetic property deviations occur. Therefore, if the amount of soluble Al is low, the control of the precipitates becomes easy, with the result that it becomes easy to control the lengthwise magnetic property deviations. Therefore, in order to ensure a stable magnetic properties, the present invention limits the contents of C and Al to 0.020–0.050% and 0.007–0.012% respectively.

Regarding S, the present invention focuses on the control of the upper limit, and this is an important task. In manufacturing the electrical steel sheet, the solidifying speed is slow in the internal region of the heated slab having a thickness of 200–250 mm, and therefore, S is intensively segregated to the internal region. Therefore, for the solid solution of S and uniform diffusion of S up to the surface, there is required a slab heating temperature which is sufficiently higher than the theoretical temperature level.

In the present invention, the amount of S is inhibited as much as possible, so that the adverse effect of the S segregation can be prevented. Further, during the hot rolling, S is precipitated in the form of a sulfide $Cu_2S$ at a low temperature of 1100° C., and therefore, the adverse effect of the distribution of coarse and non-uniform AlN which occurs in the case of the MnS precipitation is prevented, this being the major feature of the grain growth inhibitor of the present invention.

Owing to such high Mn and low S controls, AlN mostly can undergo a solid solution precipitation in spite of a low temperature slab heating, so that a sufficient grain growth inhibiting strength can be secured during the secondary recrystallization.

In addition, the addition of Cr and Ni renders the primary recrystallization grains fine and uniform. Particularly, the workable temperature range for the slab heating can be expanded, and therefore, there are prevented the work interferences which can be caused by the heating temperature difference between the slab and other steel products, thereby making it possible to achieve the object of the present invention.

The magnetic properties of the final product are decided by to what extent the grain growth inhibiting precipitates perform the optimum role during the secondary recrystallization. For this purpose, a proper process for the composition system of the present invention has to be established.

The composition system of the present invention is an AlN main system having low content of S. In this composition system, AlN is precipitated in a fine form which is advantageous for the secondary recrystallization during the cooling after a hot rolling, and therefore, thereafter, a hot rolled sheet annealing is not required, but a cold rolling is directly carried out.

Further, a decarburization annealing is carried out at an intermediate thickness, so that the second rolling can be carried out under a low carbon content. Consequently, the deformation energy which is accumulated in the steel sheet becomes small, and, thereafter, an intermediate recovery annealing is carried out at a relatively low temperature of 500°–650° C., so that the primary recrystallization grains would be fine and uniform during the finish annealing. These are important features of the present invention.

Based on the above described method, the secondary recrystallization grains form a texture which is arranged in the (110)[001} orientation which is the easy magnetization orientation.

In another embodiment of the present invention, in the low temperature reheating technique, the intermediate recovery annealing which is carried out after the final thickness rolling is omitted, and instead, the metallurgical role of this portion can be supplemented at a later process step. This will be described below.

That is, in the conventional method for manufacturing the oriented electrical steel sheet in which two-stage of rolling are carried out, the annealing after the second rolling is for recovering the deformation energy of the rolling and is for perfecting the primary recrystallization. The formation state of the primary recrystallization grains decides the formation state of the secondary recrystallization grains which utilizes the abnormal growth of the primary recrystallization grains which are formed in the finish annealing.

However, in the production line, the couple of annealing accompanying the two-stage rolling are a great burden in view of the facility management and productivity. Therefore, if the same magnetic properties can be secured with one-stage of annealing and rolling, a great advantage can be obtained.

Therefore, in the present invention, while observing the secondary recrystallization principle and the grain growth mechanism, the second recovery annealing is omitted, and, in the low temperature interval of the finish annealing, the heating rate is maintained at below 50° C./hr, so that the rolling structure can be recovered in the temperature range of 400°–500° C., and that fine and uniform primary recrystallization grains can be secured in the temperature range of 500°–650° C.

Owing to these fine and uniform primary recrystallization grains, there is secured the driving force for the secondary recrystallization which occurs in the subsequent temperature range of 870°–970° C. Thus there are ensured secondary recrystallization grains which have superior magnetic properties, and which are arranged in the (110)[001] orientation.

In another embodiment of the present invention, in order to improve the glass film characteristics, the intermediate recovery annealing can be carried out at a slightly higher temperature of 600°–700° C. for 45 seconds to 2 minutes under a humid atmosphere having a $P_{H_2O}/P_{H_2}$ ratio of 0.62–0.88. This will be described below in detail.

The present invention has a particular metallurgical background such that a decarburization annealing has to be carried out at an intermediate thickness of 0.60–0.75 mm. Therefore, an optimum control is necessary in view of the decarburization. In addition, as the forsterite film ($Mg_2SiO_4$) formed during the finish annealing depends on the quality and amount of the oxides which are formed on the outside and inside of the steel, more strict production line control has to be carried out compared with the conventional method in which the decarburization annealing is carried out at the final thickness of 0.23–0.35 mm.

The present inventors investigated the various factors related to the forsterite film characteristics, and found the following facts. That is, the oxide layer which is formed during the decarburization annealing at an intermediate thickness are partially cracked after second cold rolling, and as a result, an unstable forsterite film, which is partially peeled, is formed. Therefore, in such regions, the color of the overall coating layer looks non-uniform, and the insulation and the surface roughness are degraded. Further, at the cracked layer, there are such oxides as $SiO_2$ and $Fe_2SiO_4$, but there are FeO as well $SiO_2$ and $Fe_2SiO_4$ at the non-cracked layer. Therefore, in forming the forsterite film, it is certain that a complement of FeO which performs the role of a reaction catalyst is required. Therefore, it is necessary that there has to be provided an operating condition in which the recovery structure (which is beneficial to the magnetic properties) can be maintained while providing a condition advantageous to the formation of FeO.

Therefore, various factors for ensuring an optimum operating condition of the recovery annealing were reviewed, and the following facts were found. A stepping-up of the annealing temperature can provide the most advantageous condition for the formation of FeO. However, the stepping-up of the temperature provides a condition for the formation of the primary recrystallization grains, and therefore, a fatal defect may be caused in the primary and secondary recrystallization during the finish annealing. Therefore, it is absolutely necessary that the annealing time be properly controlled.

If the annealing temperature is decided, the kinds of the oxides on the surface of the steel are decided by the $P_{H2O}/P_{H2}$ ratio of the atmospheric gas during the oxidation reaction. The steel of the present invention requires an oxide including FeO, and therefore, the $P_{H2O}/P_{H2}$ ratio has to be controlled to a slightly high level in view of the production line.

Particularly, the partial pressure of the $H_2$ gas within the atmospheric gas plays the major role in the oxidation, and therefore, the partial pressure of the $H_2$ gas should be adjusted to 20–25%. If the partial pressure of $H_2$ is decided, the dew point is controlled for the optimum $P_{H2O}/P_{H2}$. The oxides which are required during the recovery annealing are the oxides including FeO which are filled into the cracks formed during the second rolling, and therefore, the $P_{H2O}/P_{H2}$ ratio has to be controlled to a level as high as possible, so that the formation of faylite or silica on the surface can be controlled.

Further, the annealing time has a meaning not more than for the recovery annealing, and therefore, it has to be assessed in view of the stable magnetic properties. That is, it is desirable that the temperature should be as high as possible, and the time has to be as short as possible.

As described above, the temperature, time and atmosphere for the intermediate recovery annealing can be properly controlled, so that the following advantages can be obtained. That is, the enormous advantages of the conventional oriented electrical steel sheet based on low temperature slab reheating process can be obtained, and stable magnetic properties can be ensured, and simultaneously an acceptable glass film can be formed so as for users of the product to enjoy convenience.

In another embodiment of the present invention, in manufacturing a high magnetic flux density oriented electrical steel sheet, the amount of soluble Al is limited to 0.018–0.030%, and at the same time, the heating condition of the finish annealing which is the premary and secondary recrystallization step can be controlled. This will be described in detail below.

The composition system of the present invention contains almost no S but mainly AlN. The AlN system grants that even in the low temperature heating, fine precipitates which are effective for the secondary recrystallization can be formed during a hot rolling. Therefore, without carrying out a hot rolled sheet annealing, a cold rolling is directly carried out. Further, a decarburization annealing is carried out at an intermediate thickness to reduce the content of C, and at this time, a surface oxide layer is also formed. Then a secondary cold rolling is carried out under a low carbon content, so that the processing energy would be as small as possible. Thereafter, a recovery annealing is carried out at a relatively low temperature of 500°–650° C., so that the processing structure of the rolling can be recovered. Accordingly, the primary recrystallization and the secondary recrystallization occur during the finish annealing.

Therefore, the process control is concentrated on the finish annealing. During this process step, for the preferred growth of the (110)[001] orientation, the primary recrystallization grains should be small and uniform, which is essential to develop complete secondary recrystallization.

For this purpose, the temperature raising rate in the temperature range of 400°–700° C. which is the primary recrystallization temperature is maintained faster than 25° C./hr, so that the primary recrystallization grains would be small and uniform. At this time, a strong grain growth inhibiting strength should be maintained in order to develop the secondary recrystallization which occurs at a temperature of 870°–950° C. And thereby, the superior secondary recrystallization grains having the (110)[001] orientation can be obtained, and as a result, it is possible to manufacture a high magnetic flux density oriented electrical steel sheet.

In another embodiment of the present invention, in order to manufacture an oriented electrical steel sheet having stable magnetic properties, the amount of soluble Al is limited to 0.007–0.012%, and at the same time, the atmospheric gas in the temperature-raising stage can be controlled during the finish annealing. This will be described in detail below. The present inventors observed the behaviors of the AlN precipitates which are the main precipitates for inhibiting the grain growth during the respective process steps, and found the following facts.

That is, the AlN precipitates can be controlled as to their amount during the steel manufacturing process. Thereafter, some quality adjustment of some fine needle-like type precipitates is achieved during the hot rolling, and thereafter, some fine and non-uniform plate type precipitates are formed during the intermediate decarburization annealing. Thereafter, during the final finish annealing and in the temperature interval from 800° C. to 920°–980° C. just before the secondary recrystallization, the unreacted Al are reacted with N to produce AlN precipitates after nitrogen of the atmospheric gas is intruded into the steel. Thus the AlN precipitates are somewhat increased, while some part of N is reacted with Si within the steel to form $Si_3N_4$ precipitates, thereby reinforcing the grain growth inhibiting strength.

Under this condition, the conditions including the amount and size of the AlN precipitates can be different depending on the given operating conditions. After all, however, they are decided by the content of N within the atmospheric gas, and therefore, ensuring the optimum content of N within the atmospheric gas is important.

Under this condition, the amount and conditions of the precipitates which are effective for the secondary recrystallization are decisively influenced by the amounts of Al and N in the stage of the steel making. Thereafter, the size and distribution are varied by the variation of the operating conditions, the final size and distribution of the precipitates are decided by the amount, size and distribution of the precipitates just before the initiation of the secondary recrystallization during the final finish annealing.

Under this condition, if the amount of AlN is too large so as for the grain growth inhibiting strength to be strong, the secondary recrystallization is completed by the normal growth other than the preferred growth of the grains having the (110)[001] orientation. Therefore, there are formed only fine grains which are disadvantageous for the magnetic properties, thereby degrading the oriented electrical steel sheet.

On the other hand, if the AlN precipitates are too small so as for the grain growth inhibiting strength to be too insufficient, there are formed secondary recrystallization grains which are poor in the orientation due to the growth of random orientation grains, thereby degrading the electrical steel sheet.

Under this condition, for the optimum grain growth inhibiting strength, an optimum balance between the amount of Al and the amount of N are required. If the amount of soluble Al is too low, the excessive absorption of N causes fine precipitates of 100–1000 A to be formed initially, and later, they are formed into large precipitates of Si(Mn)N or Al(Mn)N, with the result that the growth of the primary recrystallization grains cannot be inhibited. Consequently, orientations which are disadvantageous to the magnetic properties are grown, thereby degrading the magnetic properties. Therefore, the optimum absorption of N suitably to the amount of soluble Al is necessary to ensure a high magnetic flux density.

Therefore, if the initial amount of soluble Al is too small, then the amount of N should be controlled accordingly during the process. That is, the nitrogen content within the atmospheric gas should be controlled to a low level, so that the nitrogen would be absorbed into the steel during the final finish annealing.

Thus, in the present invention, the nitrogen content within the atmospheric gas is controlled to a low level during the heating stage of the finish annealing, so that stable magnetic properties can be ensured even under a low level of soluble Al.

Now the reason for the limitation of the ingredient ranges and the manufacturing conditions will be described below.

Carbon (C) acts to form a proper hot rolled structure for ensuring a high magnetic flux density of the oriented electrical steel sheet, and provides a high level of the deformation energy during the cold rolling. Therefore, C is required at least 0.035%, but if its content is more than 0.05%, then the decarburization is aggravated. Further, if the residual carbon level is high, the magnetic properties are degraded when the product is used by users. Therefore, the content of C should be desirably limited to a range of 0.035–0.050%.

However, in the case where the amount of soluble Al is limited to a range of 0.018–0.03% for manufacturing a high magnetic flux density oriented electrical steel sheet, or where the amount of soluble Al is limited to 0.007–0.012% for manufacturing an oriented electrical steel sheet having stable magnetic properties, the lower limit of the C content can be expanded down to 0.020%.

Silicon (Si) is a basic ingredient of the electrical steel sheet, and acts to raise the resistivity of the steel sheet, thereby reducing the iron loss. If the content of Si is lower than 2.9%, the iron loss is aggravated. On the other hand, if its content is higher than 3.3%, the steel become brittle, with the result that the cold rollability is aggravated. Further, the secondary recrystallization becomes unstable, and consequently, there is generated a defect called "streak" which is a portion of an defect formation of the secondary recrystallization in the lengthwise direction. Therefore, the content of Si should be desirably limited to a range of 2.9–3.3%.

Manganese (Mn) acts to lower the solid solution temperature of the precipitates during the heating of the steel slab, and prevents the formation of cracks on the both side edges of the steel sheet during the hot rolling. If its content is exceeds 0.32%, the close adherence of the forsterite insulating film which is formed by the Mn oxides (which are formed during the decarburization annealing) is aggravated. Therefore, the content of Mn should be desirably limited to less than 0.32%.

Further, Mn forms precipitates together with the tiny amount of S, and therefore, the control of the amount ratio of Mn/S is important. This ratio should be controlled to at least 20 or more, so that stable secondary recrystallization grains can be obtained with a low level of fine grain generation. Therefore, it is desirable that the weight ratio of Mn/S should be desirably limited to 20 or more.

Sulphur (S) forms precipitates of sulfides of Cu and Mn to act as a grain growth inhibitor. That is, it performs an auxiliary function AlN. Generally, S is contained up to 0.005%, and its content should be as low as possible. If the content of S exceeds 0.007%, the segregation of S becomes severe in the central portion of the slab during the solidification of the slab after the continuous casting. Further, owing to the low temperature heating of the slab, the solid solution and diffusion in the central portion of the slab becomes difficult during the hot rolling, and therefore, property deviations can occur in the final product. Therefore, sulphur purification process step has to be employed to strongly inhibit its content, and thus, its content should be desirably limited to less than 0.007%.

Aluminum (Al) is a basic ingredient which forms AlN precipitates by being reacted with N so as to inhibit the grain growth. The total amount of Al does not have a significant meaning, but the amount of soluble Al is important. If the content of Al is less than 0.01%, the grain growth inhibiting strength sufficient for the secondary recrystallization is not provided, with the result that fine grains having small sizes and imperfect shapes are formed in the final product. On the other hand, if its content exceeds 0.017%, too strong a grain growth inhibiting strength is provided, with the result that the magnetically advantageous (110)[001] orientation cannot be developed, and that the magnetic properties are drastically degraded. Therefore, the content of soluble Al should be desirably limited to a range of 0.011–0.017%. However, if an oriented electrical steel sheet having stable magnetic properties is to be manufactured, the content of soluble Al should be desirably limited to a range of 0.007–0.012%.

Further, if a high magnetic flux density oriented electrical steel sheet is to be manufactured, the Al content should be desirably limited to a range of 0.018–0.030%. The reason is as follows. That is, if the Al content is less than 0.018%, there cannot be provided a grain growth inhibiting strength sufficient for the highly oriented secondary recrystallization, and therefore, the sizes of the grains become non-uniform. Consequently, the magnetic flux density is low, and the iron loss is aggravated. On the other hand, if the Al content exceeds 0.030%, the grain growth inhibiting strength becomes too strong, with the result that the development of the secondary recrystallization of the magnetically advantageous orientation (110)[001] becomes poor. Consequently, in the case where the control of the AlN precipitates is insufficient during the process control, the magnetic properties are drastically degraded.

Nitrogen (N) reacts with the soluble Al to form AlN precipitates, thereby inhibiting the grain growth of the primary recrystallization. Therefore, N is an indispensable element for the secondary recrystallization. If its content is less than 0.008%, the formation of the precipitates becomes insufficient, while if its content exceeds 0.012%, a defect called blister is formed on the surface of the steel sheet, thereby deteriorating the surface characteristics of the product. Therefore, the content of N should be desirably limited to a range of 0.008–0.012%.

Phosphorus (P) tends to make the steel brittle, and therefore, it is more advantageous as its content is smaller. Further, its control range in the plant is up to 0.015%, and if it is added more, the cold rollability is aggravated. Therefore, its addition amount has to be restricted and therefore, the content of P should be desirably limited to less than 0.016%.

Copper (Cu) reacts with S to form precipitates of $Cu_2S$, and $Cu_2S$ is resolved at the lowest temperature among the precipitates. Further, it is precipitated at a low temperature during the hot rolling so as to reinforce the grain growth inhibiting strength of AlN, thereby facilitating the secondary recrystallization. If the content of Cu exceeds 0.6%, an adverse effect is given to the oxides which form an insulating coating layer after being formed during the decarburization annealing. Further, the sizes of the secondary recrystallization grains become too large, and therefore, the iron loss is aggravated, although the magnetic flux density is high. Therefore, the total content of Cu should be desirably limited to less than 0.6%.

In the present invention, it is important that the S ingredient is prevented from being reacted into MnS, but is made to react into $Cu_2S$. Therefore, the ratio of Cu/S has to be properly controlled. Therefore, it is desirable that the ratio of Cu/Mn is limited to 1.5 or more.

Nickel (Ni) and chromium (Cr) not only make the primary recrystallization grains fine, but also are high in their precipitate dispersing effect. Therefore, the optimum slab heating temperature range can be expanded. Therefore, if the slab heating is to be carried out at a temperature of 1250°–1320° C., Ni and/or Cr should be added by at least 0.06%. If they are added in the amount of 0.18%, they react with the C element of the steel, thereby aggravating the decarburizability. Therefore, Ni and/or Cr should be desirably limited to a range of 0.06–0.18%.

The above described composition system is for lowering the slab heating temperature which is the most difficult problem in manufacturing the oriented electrical steel sheet. If this composition system is used, the slab heating may be carried out at a temperature of 1250°–1270° C., and notwithstanding, superior magnetic properties are ensured, with the result that the economical effect is very large.

In the present invention, if the slab reheating temperature is below 1250° C., the AlN precipitates show large sizes and non-uniform distribution, so that the grain growth inhibiting strength would be too insufficient. Consequently, the secondary recrystallization becomes unstable, and therefore, it is not desirable. On the other hand, if the slab reheating temperature exceeds 1320° C., the electrical steel slab begins to be melted, with the result that the actual yield is lowered and the surface condition is aggravated. Therefore, the slab heating temperature should be desirably limited to a range of 1250°–1320° C.

If only the surface condition is considered, the slab heating temperature should be desirably limited to less than 1300° C.

In the present invention, the steel slab composed of as described above is heated as described above. Then in the general method, a hot rolling, two-stage of cold rolling including a decarburization annealing, an intermediate annealing and a finish annealing are carried out, thereby manufacturing the oriented electrical steel sheet having superior magnetic properties.

More preferably, the steel slab composed of as described above is heated to the temperature as described above, and then, a hot rolling is carried out. Then without carrying out a hot rolled sheet annealing, one-stage of cold rolling is carried out into a thickness of 0.60–0.75 mm. Then a decarburization annealing is carried out in a humid atmosphere at 820°–870° C., and then, a second cold rolling is carried out. Then an intermediate annealing is carried out at a temperature of 500°–650° C., and then, there is coated an annealing separator having MgO as the main ingredient. Then a finish annealing is carried out at a temperature of 1150°–1200° C. for 10 hours or more, thereby obtaining an oriented electrical steel sheet having superior magnetic properties.

Under this condition, it is the particular feature of the present invention that the hot rolled sheet annealing is skipped after the hot rolling, and an acid wash is directly carried out to remove the surface scales, the cold rolling then being carried out. The reason why the first cold rolling is carried out down to a thickness of 0.60–0.75 mm is that a proper reduction ratio for the final product is to be ensured. Further, the fact that the decarburization annealing is carried out at an intermediate thickness is also a major feature of the present invention. The annealing at a temperature of 820°–870° C. under a humid atmosphere is a basic condition for decarburizing at a relatively thick thickness. Then a cold rolling is carried out to the final thickness. Then a recovery annealing is carried out at a temperature of 500°–600° C. which is the temperature just before recrystallization. Then an annealing separator containing MgO as the main ingredient is coated, and then, a coiling is carried out. Then, a finish annealing is carried out at a temperature of 1150°–1200° C. for 10 hours or more, so that primary and secondary recrystallizations would occur. Then glass film is formed, and then, a purifying step is carried out, thereby obtaining a final product.

In another embodiment of the present invention, the process can be carried out in the following manner. That is, the steel slab is heated to the above mentioned temperature, and then, a hot rolling is carried out. Then without carrying out a hot rolled sheet annealing, a first cold rolling is carried out preferably into a thickness of 0.55–0.75 mm. Then a decarburization annealing is carried out preferably at a temperature of 820°–870° C. under a humid hydrogen atmosphere. Then a second cold rolling is carried out to the final thickness, and then, by skipping the low temperature intermediate recovery annealing, an annealing separator (fusion preventor) containing MgO as the main ingredient is coated. Then a final finish annealing is carried out at a temperature of 1150°–1200° C., this being an alternative method.

In this case, the heating rate in the temperature range of 400°–700° C. in which the primary recrystallization occurs has to be limited to below 50° C./hr. The reason is that, if the heating rate is over 50° C./hr, there cannot be sufficiently secured the fine and uniform primary recrystallization grains which serve the role of a driving force for the secondary recrystallization. Consequently, the secondary recrystallization becomes insufficient, with the result that partially or totally fine grains are formed, thereby extremely aggravating the magnetic properties.

In another embodiment of the present invention, the process can be carried out in the following manner. That is, after heating the steel slab to the above mentioned temperature, a hot rolling is carried out, and then, without carrying out the hot rolled sheet annealing, a first cold rolling is carried out preferably into a thickness of 0.60–0.75 mm. Then a decarburization annealing is carried out preferably at a temperature of 820°–870° C. under a humid hydrogen atmosphere. Then a second cold rolling is carried out into the final thickness, and then, an intermediate recovery annealing is carried out at a temperature of 600°–750° C. under a humid atmosphere having a $P_{H2O}/P_{H2}$ value of 0.62–0.88 for 45 seconds to 2 minutes. Then an annealing separator containing MgO as the main ingredient is coated, and then, a finish annealing is carried out at a temperature of 1150°–1200° C. for 10 hours or more, thereby obtaining an oriented electrical steel sheet having a superior glass film.

In the above described intermediate recovery annealing, if the annealing temperature is below 600° C., the oxide forming rate is too slow, thereby aggravating economical efficiency. If the annealing temperature exceeds 750° C., the primary recrystallization grains are formed so as to give a fatal adverse influence to the magnetic properties. Therefore, the present invention limits the intermediate recovery annealing temperature to 600°–750° C.

Meanwhile, as the atmospheric gas for the intermediate recovery annealing, a composite gas of $N_2$ and $H_2$ gases is used, and the amount of the gas is not specially limited, while the ratio of $P_{H2O}/P_{H2}$ is limited to 0.62–0.88.

The reason why the ratio of $P_{H2O}/P_{H2}$ for the atmospheric gas is limited to 0.62–0.88 is as follows. That is, if the ratio is less than 0.62, the oxide forming rate is too slow, while if exceeds 0.88, the glass film thus formed becomes dark, non-uniform and rough, with the result that the space factor of the final product is lowered.

Further, if the time of the intermediate recovery annealing is less than 45 seconds, the oxides formed become non-uniform, while if it exceeds 2 minutes, the primary recrystallization can occur during the recovery annealing. Therefore, it is desirable to limit the time for the intermediate recovery annealing to 45 seconds to 2.0 minutes.

In the case where the above mentioned intermediate recovery annealing conditions are applied, a homogenous glass film can be formed, thereby obtaining an oriented electrical steel sheet having superior surface quality.

In another embodiment of the present invention, the process can be carried out in the following manner. That is, a steel slab containing the soluble Al in an amount of 0.018–0.030% is heated to the above described temperature, and then, a hot rolling is carried out. Then without carrying out the hot rolled sheet annealing, a first cold rolling is carried out preferably into a thickness of 0.60–0.75 mm, and then, a decarburization annealing is carried out preferably at a temperature of 820°–870° C. under a humid atmosphere. Then a second cold rolling is carried out into the final thickness, and then, an intermediate recovery annealing is carried out at a temperature of 500°–600° C. Then an annealing separator containing MgO as the main ingredient is coated on the steel sheet, and then, a coiling is carried out. Then a finish annealing is carried out at a temperature of 1150°–1200° C. for 10 hours or more under a 100% hydrogen atmosphere. During the finish annealing, the heating rate at the temperature range of 400°–700° C. is maintained at 25° C./hr or over, thereby obtaining an oriented electrical steel sheet having a high magnetic flux density.

The control of the finish annealing which is one of the principal features of the present invention is necessary for obtaining a high magnetic flux density. For this, the heating rate in the initial temperature range of 400°–700° C. in which the primary recrystallization is completed has to be maintained at 25° C./hr or over. The reason is that, if the heating rate is lower than that, a texture of Goss orientation advantageous to the final magnetic flux density is inhibited.

In another embodiment of the present invention, the process can be carried out in the following manner. That is, a steel slab containing the soluble Al in an amount of 0.007–0.012% is heated to the above described temperature, and a hot rolling is carried out. Then without carrying out the hot rolled sheet annealing, a first cold rolling is carried out preferably to a thickness of 0.60–0.75 mm, and then, a decarburization annealing is carried out preferably at a temperature of 820°–870° C. under a humid atmosphere. Then a second cold rolling is carried out into the final thickness, and then, an intermediate recovery annealing is carried out preferably at a temperature of 500°–600° C. Then an annealing separator containing MgO as the main ingredient is coated on the steel sheet, and then, a finish annealing is carried out preferably at a temperature of 1150°–1200° C. under a 100% hydrogen atmosphere or a 10% or less nitrogen containing hydrogen atmosphere, thereby obtaining an oriented electrical steel sheet having stable magnetic properties.

In the present invention, the finish annealing is carried out with a composition system containing a low level of soluble Al. Therefore, in order to maintain the optimum ratio between the soluble Al and N, the finish annealing is carried out under an atmosphere having 100% of hydrogen or containing 10% or less of nitrogen within hydrogen, thereby obtaining the optimum inhibiting strength. If the amount of the nitrogen exceeds 10%, then the amount of the precipitates is increased, and the size of the AlN precipitates is increased. Therefore, although the secondary recrystallization occurs, its orientation is disadvantageous. Therefore, if stable magnetic properties are to be obtained, in carrying out the finish annealing, the atmospheric gas during the heating should contain 100% of hydrogen gas or 10% of nitrogen gas within hydrogen gas.

Now the present invention will be described based on actual examples.

<EXAMPLE 1>

The basic composition system included in weight %: 0.042% of C, 3.11% of Si, 0.205% of Mn, 0.006% of S, 0.0098% of S, 0.014% of P, 0.496% of Cu, 0.04% of Cr and 0.06% of Ni. Further, the amount of soluble Al was varied to 0.007%, 0.011%, 0.014%, 0.017% and 0.020%, and thus, there were prepared steel slabs having a thickness of 200 mm. Then a slab heating was carried out at a temperature of 1275° C. for 3 hours, and then, a hot rolling was carried out into a thickness of 2.3 mm, thereby forming hot rolled sheets. Then without carrying out a hot rolled sheet annealing, a first cold rolling was carried out into a thickness of 0.70 mm, and then, a decarburization annealing was carried out at a temperature of 830° C. under a humid atmosphere. Then a final cold rolling was carried out into a thickness of 0.30 mm. Then an intermediate recovery annealing at a temperature of 550° C., an MgO coating, and a finish annealing at a temperature of 1200° C. for 20 hours were carried out, thereby obtaining the conventional oriented electrical steel sheet. Then the magnetic flux densities $B_{10}$ and the fine grain formation ratio among the secondary recrystallization grains were checked, and the results were illustrated in FIG. 1. The value of the magnetic flux density $B_{10}$ is based on 1000 Amp/m, and this is the value of the magnetic flux density, the unit being Tesla.

As shown in FIG. 1, the magnetic flux density is 1.82 Teslas for the content range of 0.011–0.017% of soluble Al which is the condition of the present invention.

Further, the steel shows superior magnetic properties, having no fine grains. However, in the case of 0.007%, i.e., in the case where the range of the present invention is departed, although there are no fine grains, the grain size is too small and non-uniform, and therefore, the magnetic flux density is low. In the case of 0.020%, the secondary recrystallization grains are non-uniform, and there are large amounts of fine grains, with the result that the magnetic flux density is low. Therefore, the product becomes useless.

<EXAMPLE 2>

The basic composition system included in weight %: 0.043% of C, 3.15% of Si, 0.225% of Mn, 0.014% of soluble Al, 0.0104% of N, 0.015% of P, 0.521% of Cu, 0.05% of Cr, and 0.05% of Ni. The amounts of S were varied to 0.003%, 0.005%, 0.007%, 0.010% and 0.014%, and thus steel slabs of a 200 mm thickness were prepared. These slabs were made to undergo the slab heating step all through the final finish annealing step in the same way as that of the Example 1. For the oriented steel sheets thus obtained, the magnetic flux density $B_{10}$ and the formation of the fine grains of the secondary recrystallization were investigated, and the results were illustrated in FIG. 2.

Figure 2:
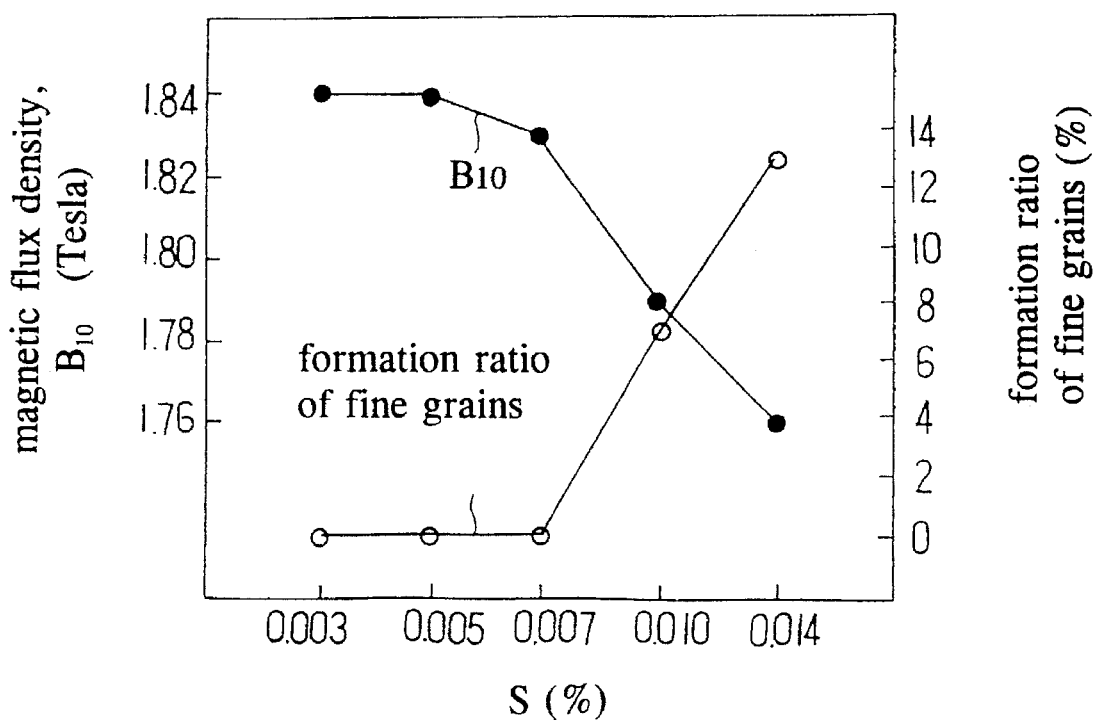
FIG. 2 is a graphical illustration showing the magnetic flux density $B_{10}$ and the formation ratio of fine grains among the secondary recrystallization grains versus the variation of the amount of S.

As shown in FIG. 2, up to 0.007% of S which belongs to the range of the present invention, there are no fine grains, and the magnetic flux density shows over 1.83 Tesla. In the case where the S content is more than 0.007%, the formation of fine grains is drastically increased, thereby steeply lowering the magnetic flux density.

<EXAMPLE 3>

The basic composition system included in weight %: 0.039% of C, 3.05% of Si, 0.005% of Mn, 0.012% of soluble Al, 0.0110% of N, 0.015% of P, 0.505% of Cu, 0.05% of Cr, and 0.05% of Ni. Then the amounts of Mn were varied so that the ratios of Mn/S would become 10, 20, 35, 50 and 65 respectively, thereby preparing steel slabs of a 200 mm thickness. These slabs were made to undergo the slab heating step all through the finish annealing step in the same way as that of Example 1.

Figure 3:
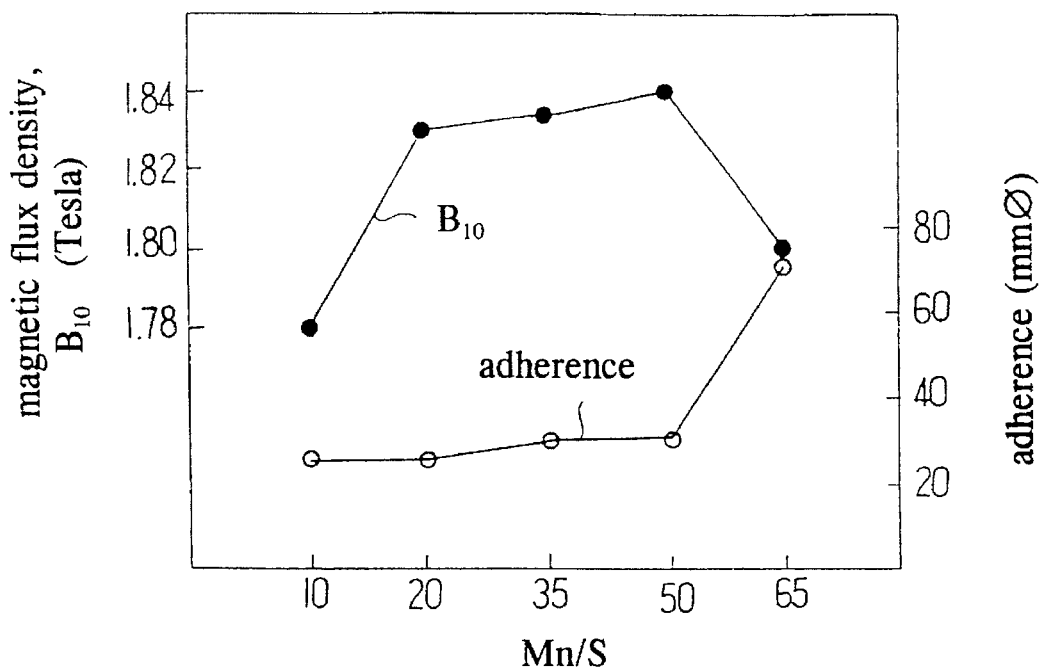
FIG. 3 is a graphical illustration showing the magnetic flux density $B_{10}$ and the close adherence of the glass coating of the product versus the variation of the Mn/S ratio.

Then for the steel sheets thus obtained, the magnetic flux density $B_{10}$ was measured, and then, there was measured the minimum diameter in mm in which a film peeling does not occur upon bending by 180°, thereby testing the close adherence of the film. The tested results were illustrated in FIG. 3. As shown in FIG. 3, when the ratio of Mn/S is 10, the close adherence is superior by showing 25 mm$\phi$, but the magnetic flux density is too low. However, in the case where the Mn content exceeds 0.32% so as for the ratio of Mn/S to be 65, the magnetic flux density is superior, but the close adherence characteristics of the product film is extremely bad by showing 70 mm$\phi$. Therefore, this product has lost the commercial value, and therefore, it was excluded from the scope of the present invention.

However, over 20 of the ratio, the magnetic flux density is as high as 1.82 Tesla or over. Further, the close adherence characteristics is 25–30 mm$\phi$, and therefore, it comes within the control range of the present invention which is 30 mm$\phi$.

<EXAMPLE 4>

The basic composition system included in weight %: 0.044% of C, 3.01% of Si, 0.195% of Mn, 0.013% of soluble Al, 0.0105% of N, 0.014% of P, 0.05% of Cr, and 0.05% of Ni. Then the contents of Cu were varied in such a manner that the ratios of Cu/Mn should become 0.5, 1.0, 1.5, 2.8, and 3.5 respectively, thereby preparing steel slabs of a 200 mm thickness. These slabs were made to undergo the slab heating step all through the finish annealing step.

Figure 4:
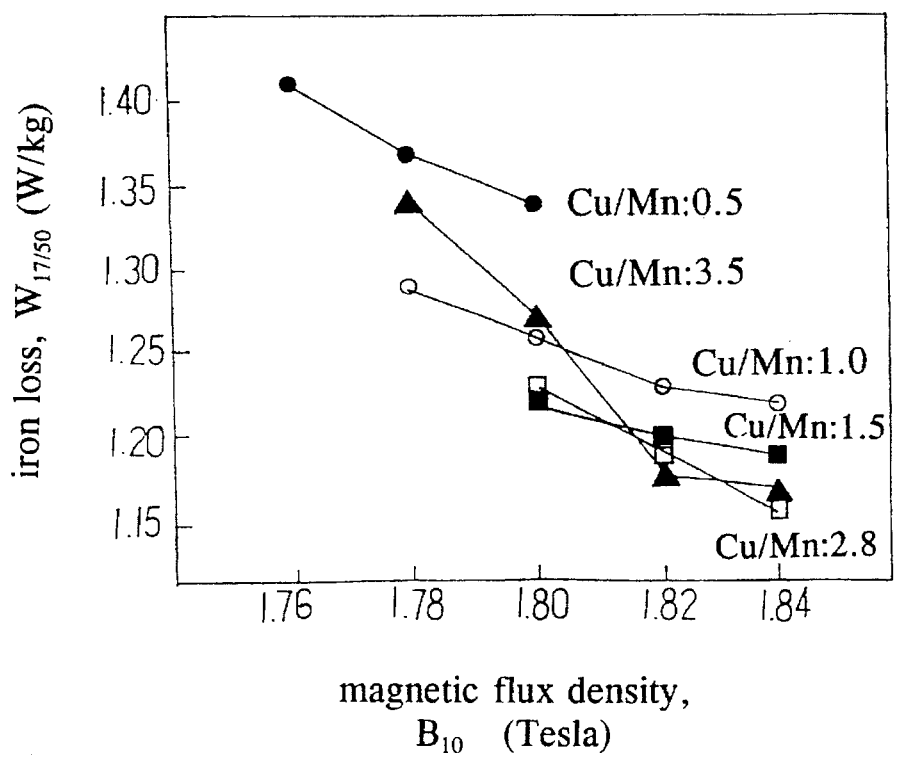
FIG. 4 is a graphical illustration showing the flux density $B_{10}$ and the iron loss $W_{17/50}$ versus the variation of the Cu/Mn ratio.

Then their magnetic properties were tested. That is, the magnetic flux density $B_{10}$ was measured, and there was also measured the iron loss $W_{17/50}$ which is the iron loss when a magnetizing was carried out to 1.7 Tesla at 50 Hz. Then the tested results were illustrated in FIG. 4, that is, FIG. 4 illustrates the magnetic flux density and the iron loss versus the ratio of Cu/Mn. As shown in FIG. 4, if the ratio of Cu/Mn is as low as 0.5, the magnetic flux density goes down to below 1.80 Tesla, while the iron loss is extremely high. In the case where the ratio of Cu/Mn is 1.0, the magnetic flux density shows a wide range of 1.78–1.84 Tesla, and the property deviations and the iron loss are high, with the result that stable properties cannot be ensured. Further, in the case where the Cu content exceeds 0.6% to show a Cu/Mn ratio of 3.5, the iron loss is low in an overall view, but the magnetic flux density is as low as 1.78 in some of them. Therefore, this product was excluded from the scope of the present invention. However, in the steel of the present invention in which the Cu/Mn ratio is 1.5–2.8, the magnetic flux density showed as high as 1.80 Tesla, and the iron loss showed as low as 1.24 W/kg. Thus there were obtained products in which the magnetic properties were superior and stable.

<EXAMPLE 5>

The basic composition system included in weight %: 0.044% of C, 3.01% of Si, 0.195% of Mn, 0.005% of S, 0.013% of soluble Al, 0.0105% of N, 0.515% of Cu, and 0.014% of P. Then the contents of Cr and Ni were varied, thereby preparing steel slabs of a 200 mm thickness. These slabs were made to undergo the slab heating step all through the finish annealing. Then the magnetic flux density value $B10$ and the iron loss value $W_{17/50}$ were measured, and the measured results were shown in Table 1 below.

TABLE 1

| Test specimen | Addition (%) | | Magnetic properties* | |
|---|---|---|---|---|
| | Cr | Ni | Flux density $B_{10}$ (T) | Iron loss $W_{17/50}$ (W/kg) |
| Comparative 1 | 0 | 0 | 1.774 | 1.43 |
| Comparative 2 | 0.02 | 0.04 | 1.785 | 1.38 |
| Inventive 1 | 0.07 | 0 | 1.824 | 1.18 |
| Inventive 2 | 0.05 | 0.05 | 1.836 | 1.20 |
| Inventive 3 | 0.10 | 0.08 | 1.830 | 1.24 |
| Inventive 4 | 0.05 | 0.12 | 1.835 | 1.28 |
| Comparative 3 | 0.10 | 0.10 | 1.811 | 1.34 |
| Comparative 4 | 0.15 | 0.15 | 1.803 | 1.38 |

*The magnetic flux density $B_{10}$ (Tesla) indicates a flux density obtained when the magnetizing is carried out with 1000 Amp/m.
**The iron loss $W_{17/50}$ (W/kg) indicates an iron loss obtained when the magnetizing is carried out in such a manner that a flux density should be obtained with 50 Hz.

As shown in Table 1 above, in the cases of the comparative steels 1 and 2 in which the contents of Cr and Ni were none or very small, the secondary recrystallization was unstable, with the result that fine grains were produced very much. Consequently, the magnetic flux density was low and the iron loss was high, thereby giving an inferior steel sheet.

On the other hand, in the cases of the inventive steels 1 to 4, the magnetic flux density was high, and the iron loss was low, thereby giving a superior electrical steel sheet. Meanwhile, in the cases of the comparative steels 3 and 4 in which the contents of the Cr and Ni exceeded 0.2%, the secondary recrystallization grains were small and nonuniform, and therefore, the magnetic properties were rather degraded.

<EXAMPLE 6>

Steel slabs of a 200 mm thickness were prepared, and the slabs were composed of in weight %: 0.039% of C, 3.12% of Si, 0.225% of Mn, 0.005% of S, 0.014% of soluble Al, 0.0095% of N, 0.510% of Cu, 0.015% of P, 0.05% of Cr, 0.05% of Ni, and balance of Fe. For these steel slabs, the heating temperature was varied to 1200°, 1225°, 1250°, 1275°, 1300°, 1325° C. respectively, and at these temperatures, the slabs were soaked for 3 hours respectively. Then a hot rolling was carried out, and then, they were made to undergo the cold rolling all through the finish annealing. Then the magnetic flux density $B_{10}$ and the loss due to the melting of the material were checked, and the tested results were illustrated in FIG. 5.

Figure 5:
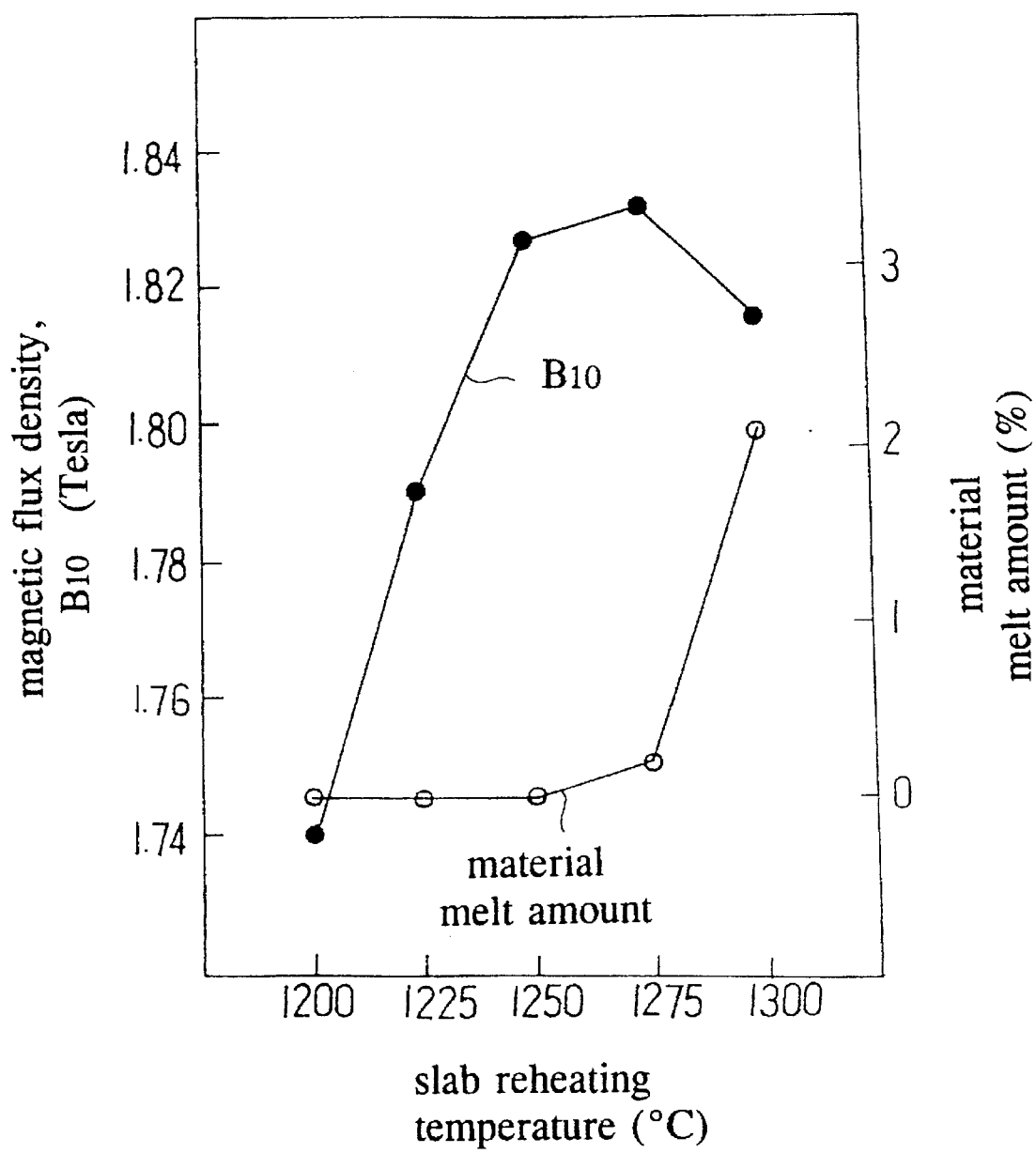
FIG. 5 is a graphical illustration showing the magnetic flux density $B_{10}$ and the material melt amount versus the slab reheating temperature.

As shown in FIG. 5, the magnetic flux density was improved as the slab heating temperature was elevated, and at the heating temperature of 1250° C., the flux density showed 1.83 Tesla, while the magnetic flux density was highest at the heating temperature of 1300° C.

However, at the heating temperature of 1325° C., a relatively high magnetic flux density was seen, but due to the increase in the melting of the material, not only the actual yield was lowered, but also the workability and the economical efficiency were aggravated. Therefore, it was excluded from the scope of the present invention.

However, in the heating temperature range of 1250°–1275° C. which is the range of the present invention, there was no melting at all, while at 1300° C., the formation of scales was increased, but there was no problem in the actual yield and the workability.

<EXAMPLE 7>

Steel slabs of a 200 mm thickness were prepared, and the steel slabs were composed of in weight %: 0.039% of C, 3.12% of Si, 0.225% of Mn, 0.005% of S, 0.014% of soluble Al, 0.0095% of N, 0.510% of Cu, 0.015% of P, 0.05% of Cr, 0.05% of Ni, and balance of Fe. These slabs were let to undergo the slab heating step all through the finish annealing in the same way as that of Example 1, thereby carrying out the process of the present invention. For comparison, comparative steels were manufactured based on a method of one-stage cold rolling and a method of two-stages cold rolling respectively.

In the case of the one-stage cold rolling method, a hot rolled sheet annealing was carried out at 1120° C., and then, one-stage of cold rolling was carried out into a final thickness of 0.30 mm. Then, a decarburization annealing at 830° C. under a humid atmosphere, coating of MgO, and a final finish annealing at 1200° C. for 20 hours were carried out.

In the case of the two-stage rolling method, a hot rolled sheet annealing was carried out at 1120° C., and then, a first cold rolling was carried out into a thickness of 0.75 mm. Then an intermediate annealing was carried out at 920° C., and then, a second cold rolling was carried out into a thickness of 0.30 mm. Then a decarburization annealing at 830° C. under a humid atmosphere, coating of MgO, and a final finish annealing were carried out at 1200° C. for 20 hours.

The magnetic properties of these three differently processed steels such as magnetic flux density $B_{10}$, the iron loss $W_{17/50}$, and the formation rate of fine grains of the secondary recrystallization were measured, and the measured results were shown in Table 2 below.

TABLE 2

| Process | flux dnsity $B_{10}$ (Tesla) | Iron loss $W_{17/50}$ (W/kg) | Fine grains (%) |
|---|---|---|---|
| Inventive 5 | — | 1.84 | 1.18 | 0 |
| Comparative 5 | one-stage rolling | 1.63 | 1.78 | 53 |
| Comparative 6 | two-stage rollings | 1.75 | 1.48 | 14 |

As shown in Table 2 above, in the case where the process of the present invention is applied (the inventive steel 5), the magnetic properties were such that the magnetic flux density was high, and the iron loss was low. However, in the case where the usual one-stage rolling method was applied (the comparative steel 5), the secondary recrystallization was bad, and the formation of fine grains was high. Therefore, the magnetic flux density was extremely low, and the iron loss was high, thereby making it impossible to use it. Meanwhile, in the case of the usual two-stage rolling method (Comparative steel 6), the magnetic properties were slightly improved compared with the one-stage rolling method, but it was impossible to use the product.

<EXAMPLE 8>

Steel slabs of a 200 mm thickness were prepared, and the steel slabs were composed of in weight %: 0.035% of C, 3.14% of Si, 0.215% of Mn, 0.004% of S, 0.016% of soluble Al, 0.0093% of N, 0.515% of Cu, 0.013% of P, 0.04% of Cr, 0.05% of Ni, and balance of Fe.

Theses slabs were heated at a temperature of 1300° C. for 3 hours, and then, a hot rolling was carried out. Then without carrying out a hot rolled sheet annealing, a first rolling was carried out into a thickness of 0.65 mm. Then a decarburization annealing was carried out at a temperature of 850° C. under a humid atmosphere, and a final cold rolling was carried out into a thickness of 0.30 mm. Then a recovery annealing was carried out at a temperature of 550° C. for 2 minutes under a dry atmosphere, and then, an annealing separator containing MgO as the main ingredient was coated, and a coiling was carried out into rolls. Then the rolls were heated rapidly up to 400° C., and the heating rate was varied within a range of 10°–100° C./hr up to 700° C. Then the rolls were further heated up to 1200° C. at a heating rate of 20° C./hr, and the rolls were soaked at 1200° C. for 20 hours. Then a cooling was carried out, thereby completing the finish annealing. Under this condition, the atmospheric gas was composed of 25% of nitrogen and 75% of hydrogen during the heating, and otherwise the atmospheric gas was composed of 100% of hydrogen, thereby manufacturing the conventional oriented electrical steel sheets. For these sheets, the magnetic flux density and the iron loss were measured, and the measured results are shown in Table 3 below.

TABLE 3

| | heating rate (°C./hr) | | magnetic properties* | |
|---|---|---|---|---|
| | 400–700° C. | 700–1200° C. | Flux density (Tesla) | Iron loss (W/kg) |
| Comparative 7 | 7 | 20 | 1.66 | 1.84 |
| Comparative 8 | 15 | 20 | 1.78 | 1.52 |
| Inventive 6 | 20 | 20 | 1.84 | 1.23 |
| Inventive 7 | 30 | 20 | 1.86 | 1.19 |
| Inventive 8 | 50 | 20 | 1.87 | 1.16 |
| Inventive 9 | 100 | 20 | 1.86 | 1.17 |

*Magnetic flux density $B_{10}$ (Tesla): magnetic flux density induced when magnetized with 1000 Amp/m.
*Iron loss $W_{17/50}$ (W/kg): iron loss caused when magnetized such that 1.7 Teslas are obtained at 50 Hz.

As shown in Table 3 above, as the first heating rate was high, so much superior was the magnetic properties. Particularly, above 20° C./hr which is the condition of the present invention, the magnetic flux density was as high as 1.84, and the iron loss was as low as 1.23 W/kg, thereby showing superior magnetic properties.

However, in the comparative steels 7 and 8 in which the first heating rate was low, the secondary recrystallization was unstable, and fine grains were formed, with the result that the magnetic properties were drastically degraded.

<EXAMPLE 9>

Steel slabs of a 200 mm thickness were prepared, and the steel slabs were composed of as shown in Table 4 below. Then the slabs were heated at 1275° C. for 3 hours, and then, a hot rolling was carried out into a thickness of 2.3 mm. Then without carrying out a hot rolled sheet annealing, an pickling was carried out and then, a hot rolling was carried out. Then a cold rolling was carried out into a thickness of 0.60 mm, and then, a decarburization annealing was carried out at a temperature 860° C. under a humid atmosphere. Then a final cold rolling was carried out into a thickness of 0.30 mm.

For some of the cold rolled sheet, an intermediate annealing was carried out at 550° C. for 2 minutes (conventional method), while for some of the cold rolled sheet, the intermediate annealing was not carried out (method of the present invention). On these two kinds of sheets, an annealing separator containing MgO as the main ingredient was coated, and then, the sheets were coiled into rolls. The temperature was raised up to 700° C. at heating rate of 80° C./hr for the conventional steel, and at a heating rate of 25° C./hr for the steel of the present invention respectively. Then the temperature was raised up to 1200° C. at a heating rate of 20° C./hr for the both kinds of the steels, and this temperature was maintained for 20 hours, thereby completing the finish annealing to obtain conventional oriented electrical steel sheets.

For the oriented electrical steel sheets manufactured as described above, the magnetic flux density $B_{10}$ and the iron loss $W_{17/50}$ were measured, and the measured results are shown in Table 5 below.

<EXAMPLE 10>

Steel slabs of a 200 mm thickness were prepared by using the steel C-2 of Table 4, and these steel slabs were reheated at 1275° C. for 3 hours. Then a hot rolling was carried out into a thickness of 2.3 mm, and then, without carrying out a hot rolled sheet annealing, a first cold rolling was carried out into a thickness of 0.65 mm. Then, a decarburization annealing was carried out at 850° C. under a humid atmosphere, and then, a final cold rolling was carried out into a thickness of 0.30 mm. Then skipping a second recovery annealing, an annealing separator containing MgO as the main ingredient was coated, and then, a coiling was carried out into rolls. Then a rapid heating was carried out up to 400° C., and then, the temperature was raised up to 700° C. with the heating rate varied within a range of 10°–100° C./hr. Then the temperature was raised at a heating rate of 20° C./hr, and a soaking was carried out at this temperature for 20 hours, thereby completing the finish annealing. Under this condition, the atmospheric gas was composed of 25% of nitrogen and 75% of hydrogen during the heating, and otherwise, the atmospheric gas was composed of 100% of hydrogen, thereby manufacturing conventional oriented electrical steel sheet. For these steel sheets, the magnetic flux density $B_{10}$ and the iron loss $W_{17/50}$ were measured, and the results are shown in Table 6 below.

TABLE 4

| composition melts | C | Si | P | N | S | Ni + Cr | Mn | Cu | Sol.Al |
|---|---|---|---|---|---|---|---|---|---|
| C-1 | 0.038 | 3.02 | 0.014 | 0.009 | 0.005 | 0.092 | 0.212 | 0.501 | 0.016 |
| C-2 | 0.044 | 3.21 | 0.013 | 0.011 | 0.003 | 0.114 | 0.208 | 0.508 | 0.012 |
| C-3 | 0.040 | 3.21 | 0.014 | 0.009 | 0.006 | 0.104 | 0.212 | 0.501 | 0.019 |

TABLE 5

| | C-1 | | C-2 | | C-3 | |
|---|---|---|---|---|---|---|
| | Flux density $B_{10}$ (T) | Iron loss $W_{17/50}$ (W/kg) | Flux density $B_{10}$ (T) | Iron loss $W_{17/50}$ (W/kg) | Flx density $B_{10}$ (T) | Iron loss $W_{17/50}$ (W/kg) |
| Conventional | 1.86 | 1.20 | 1.84 | 1.27 | 1.85 | 1.22 |
| Inventive | 1.86 | 1.19 | 1.85 | 1.25 | 1.85 | 1.21 |

As shown in Table 5 above, in the steels C-1, C-2 and C-3, compared with the conventional steel in which a second intermediate recovery annealing is carried out at 550° C., the steel of the present invention in which no such annealing was carried out showed similar magnetic flux densities and iron losses or slightly superior levels.

However, the present invention shortens the manufacturing process, and therefore, economical efficiency is improved.

TABLE 6

| | | | Magnetic properties | |
|---|---|---|---|---|
| Test | heating rate (°C./hr) | | Flux density | Iron loss $W_{17/50}$ |
| specimen | 400–700° C. | 700–1200° C. | $B_{10}$ (Tesla) | (W/kg) |
| Inventive 10 | 10 | 20 | 1.86 | 1.17 |
| Inventive 11 | 25 | 20 | 1.86 | 1.19 |
| Inventive 12 | 50 | 20 | 1.84 | 1.26 |
| Comparative 9 | 100 | 20 | 1.80 | 1.47 |

As shown in Table 6 above, the slower the initial heating rate was, the more superior the magnetic properties were. However, superior magnetic properties were seen up to 50° C./hr which is the condition of the present invention. However, at a heating rate of 100° C./hr which departs from the condition of the present invention, the secondary recrystallization became unstable to form fine grains, and therefore, the magnetic properties were drastically aggravated, with the result that the product became useless.

<EXAMPLE 11>

Continuous casting steel slabs 200 mm thick were prepared, and the steel slabs were composed of in weight %: 0.042% of C, 3.117% of Si, 0.205% of Mn, 0.006% of S, 0.00983% of N, 0.014% of P, 0.496% of Cu, 0.04% of Cr, 0.06% of Ni and 0.014% of soluble Al. These slabs were reheated at 1300° C. for 3 hours, and then, a hot rolling was carried out into a thickness of 2.3 mm. Then without carrying out a hot rolled sheet annealing, a first cold rolling was carried out into a thickness of 0.65 mm, and then, a decarburization annealing was carried out at 860° C. under a humid atmosphere to reduce the residue content of C. Then a final cold rolling was carried out into a thickness of 0.30 mm. Then, a second recovery annealing was carried out at an annealing temperature of 550°–800° C. under a 10% hydrogen containing nitrogen atmosphere, with the $P_{H2O}/P_{H2}$ ratio being varied from dry to 0.96, and with the maintenance time in furnace being varied from 0.5 to 2.5 minutes. Thereafter, MgO was coated, and a finish annealing was carried out at 1200° C. for 20 hours, thereby obtaining conventional oriented electrical steel sheets.

For the steel sheets manufactured based on the above described method, the glass film characteristics (appearance and insulating strength) and the magnetic properties (the magnetic flux density and the iron loss) for the different recovery annealing conditions were measured, and the measured results are shown in Table 7 below.

In Table 7 below, the appearance of the glass film is the forsterite film formation state which was observed by the human eyes, while the insulating property is the currents in amperes which passed through the coating when 0.5 volts and 1.0 amperes were supplied by using the Franklin Insulation Tester based on the testing method of ASTM A717-15. If the value of the received current is low, the insulating characteristics are so much superior.

As shown in Table 7 above, in the case where the intermediate recovery annealing was carried out at a temperature of 550° C., the magnetic properties were adequate, but the glass film was too thin and rough, with the result that the insulating property was aggravated. On the other hand, in the case where the intermediate recovery annealing was carried out at a temperature of 650° C. which is the condition of the present invention, although the thickness was somewhat thin, the insulating strength was satisfactory as much as intended. Further, at a temperature of over 650° C. up to 750° C., not only the magnetic properties but also the glass coating were superior.

However, if the intermediate recovery annealing was carried out at 800° C., not only the glass film was rough, but also the magnetic properties were drastically aggravated.

Meanwhile, in the case where the intermediate recovery annealing was carried out under a dry atmosphere or at 0.45 of the $P_{H2O}/P_{H2}$ ratio, the magnetic properties were adequate, but the glass film was too thin as well as being too weak in the insulating property. On the other hand, in the case where the intermediate recovery annealing was carried out at a ratio of 0.62–0.88 which is the range of the present invention, the glass film is uniform, its color is desirable, and its insulating property is adequate. However, if the humidity of the furnace atmosphere exceeded the mentioned range, the glass film was dark and rough, and its insulating strength was aggravated.

In the case where the time for the intermediate recovery annealing was 30 seconds, it was too short to complete the coating formation. However, if the time was 0.8–2.0 minutes, an optimum glass film could be obtained. If the annealing time was longer than the mentioned range, the magnetic properties which is the condition for the present invention were aggravated.

<EXAMPLE 12>

The basic composition system was composed of in weight %: 3.05–3.21% of Si, 0.29–0.43% of C, 0.196–0.225% of Mn, 0.003–0.006% of S, 0.009–0.012% of N, 0.013–0.014% of P, 0.477–0.513% of Cu, and 0.004% of Cr and also

TABLE 7

| Steel | Condition for recovery annealing | | | Glass film characteristics | | Magnetic properties* | |
|---|---|---|---|---|---|---|---|
| | temp. (°C.) | $P_{H2O}/P_{H2}$ | time | insulating value (Amp) | appearance | Magnetic flux density $B_{10}$ (Tesla) | Iron loss, $W_{17/50}$ (W/kg) |
| Comparative-10 | 550 | 0.80 | 1.2 | 0.645 | thin and rough | 1.85 | 1.24 |
| Inventive-13 | 650 | 0.80 | 1.2 | 0.556 | slightly thin | 1.86 | 1.24 |
| Inventive-14 | 700 | 0.80 | 1.2 | 0.486 | good | 1.84 | 1.23 |
| Inventive-15 | 750 | 0.80 | 1.2 | 0.459 | good | 1.85 | 1.25 |
| Comparative-11 | 800 | 0.80 | 1.2 | 0.433 | good | 1.80 | 1.30 |
| Comparative-12 | 700 | dry | 1.2 | 0.725 | thin and rough | 1.84 | 1.24 |
| Comparative-13 | 700 | 0.45 | 1.2 | 0.687 | thin and rough | 1.85 | 1.23 |
| Inventive-16 | 700 | 0.63 | 1.2 | 0.535 | slightly thin | 1.86 | 1.24 |
| Inventive-17 | 700 | 0.75 | 1.2 | 0.448 | good | 1.84 | 1.25 |
| Inventive-18 | 700 | 0.86 | 1.2 | 0.452 | good | 1.86 | 1.24 |
| Comparative-14 | 700 | 0.96 | 1.2 | 0.534 | dark and non-uniform | 1.84 | 1.25 |
| Comparative-15 | 700 | 0.80 | 0.5 | 0.618 | thin and rough | 1.85 | 1.24 |
| Inventive-19 | 700 | 0.80 | 0.8 | 0.512 | good | 1.85 | 1.25 |
| Inventive-20 | 700 | 0.80 | 2.0 | 0.425 | good | 1.85 | 1.24 |
| Comparative-16 | 700 | 0.80 | 2.5 | 0.588 | thick and rough | 1.82 | 1.28 |

*Magnetic flux density $B_{10}$ (Tesla): the magnetic flux density induced when magnetized with 1000 Amp/m.
*Iron loss $W_{17/50}$ (W/kg): the iron loss when magnetized such that 1.7 Tesla is obtained at 50 Hz.

0.093–0.0117% of Cr and/or Ni. To this basic component system, the amount of soluble Al was varied into 5 different melts as shown in Table 8 below.

Steel slabs which were 200 mm thick and were composed of as described above were prepared. These steel slabs were reheated at 1275° C. for 3 hours, and then, a hot rolling was carried out into a thickness of 2.3 mm. Then without carrying out a hot rolled sheet annealing, a cold rolling was carried out into a thickness of 0.60 mm, and then, a decarburization annealing was carried out at 850° C. under a humid atmosphere. Then a final cold rolling was carried out into a thickness of 0.30 mm. Then an intermediate recovery annealing was carried out at 550° C., then MgO was coated, and then, a coiling was carried out into rolls. Then a finish annealing was carried out in such a manner that first an initial rapid heating was carried out, then further heating was carried out from 400° C. to 700° C. by applying a heating rate of 30° C./hr, then further heating was carried out to 1200° C. by applying a heating rate of 25° C./hr, and then, the final temperature of 1200° C. was maintained for 20 hours to soak the steel. Then a cooling was carried out, thereby obtaining a high magnetic flux density oriented electrical steel sheet.

For the oriented electrical steel sheets manufactured based on the above described method, the flux density and the iron loss were measured, and the measured results are shown in Table 9 below.

material and in which the amount of the soluble Al was higher than the range of the present invention, fine grains having a diameter of less than 3 mm existed, and therefore, the magnetic properties were drastically aggravated.

<EXAMPLE 13>

Steel slabs of a 200 mm thickness were prepared, and the steel slabs had the same composition as that of the inventive steel 2 of Table 8 of Example 12. These slabs were reheated at 1275° C. for 3 hours, and then, a hot rolling was carried out into a thickness of 2.3 mm. Then without carrying out a hot rolled sheet annealing, a first cold rolling was carried out into a thickness of 0.65 mm. Then a decarburization annealing was carried out at 850° C. under a humid atmosphere, and then, a final cold rolling was carried out into a thickness of 0.30 mm. Then an intermediate annealing was carried out at 550° C., then MgO was coated, and then, a final finish annealing was carried out.

As shown in Table 10 below, in carrying out the final finish annealing, the heating rate was varied in the temperature interval of 400°–700° C. in which the primary recrystallization occurs, while the heating rate was fixed to 25° C./hr in the temperature range of 700°–1200° C. A soaking was carried out at 1200° C. for 20 hours. Then a cooling was carried out. Here, the atmospheric gas was composed of 25% of nitrogen and 75% of hydrogen during the heating, and otherwise, the atmospheric gas was composed of 100% of hydrogen.

TABLE 8

Unit: Weight %

| composition steel | C | Si | P | N | S | Ni + Cr | Mn | Cu | Sol.Al |
|---|---|---|---|---|---|---|---|---|---|
| Comparative a | 0.043 | 3.21 | 0.014 | 0.011 | 0.005 | 0.104 | 0.214 | 0.498 | 0.014 |
| Inventive 1 | 0.029 | 3.09 | 0.014 | 0.010 | 0.005 | 0.093 | 0.223 | 0.501 | 0.018 |
| Inventive 2 | 0.035 | 3.16 | 0.013 | 0.012 | 0.004 | 0.117 | 0.219 | 0.510 | 0.022 |
| Inventive 3 | 0.041 | 3.19 | 0.013 | 0.011 | 0.005 | 0.106 | 0.198 | 0.513 | 0.028 |
| Comparative b | 0.034 | 3.06 | 0.013 | 0.011 | 0.003 | 0.105 | 0.196 | 0.489 | 0.034 |

TABLE 9

| Test specimen | Steel | Flux density $B_{10}$ (Tesla) | Iron loss $W_{17/50}$ (W/kg) |
|---|---|---|---|
| Comparative 17 | C. steel a | 1.87 | 1.14 |
| Inventive 21 | I. steel 1 | 1.91 | 1.09 |
| Inventive 22 | I. steel 2 | 1.93 | 1.00 |
| Inventive 23 | I. steel 3 | 1.90 | 1.03 |
| Comparative 18 | C. steel b | 1.84 | 1.21 |

In the above table, "C. steel" indicates comparative steel, and "I. steele" indicates inventive steel.

As shown in Table 9 above, in the cases of the inventive materials 21–23 in which the starting material contained 0.018–0.030% of soluble Al which is the range of the present invention, the magnetic flux density $B_{10}$ was more than 1.89 Tesla, while the iron loss $W_{17/50}$ was lower than 1.09 W/kg.

However, in the case of the comparative material 17 in which the comparative steel(a) was used as the starting steel and in which the amount of the soluble Al was lower than the range of the present invention, the secondary recrystallization occurred, but the orientation was not adequate, with the result that the magnetic properties were aggravated. Meanwhile, in the case of the comparative material 18 in which the comparative steel(b) was used as the starting After the final annealing, the magnetic properties were checked for the different heating rate, and the tested results are shown in Table 10 below.

TABLE 10

| | | | Magnetic properties | |
|---|---|---|---|---|
| Test | heating rate (°C./hr) | | Flux density | Iron loss $W_{17/50}$ |
| specimen | 400–700° C. | 700–1200° C. | $B_{10}$ (Tesla) | (W/kg) |
| Comparative 19 | 10 | 25 | 1.76 | 1.46 |
| Comparative 20 | 20 | 25 | 1.85 | 1.23 |
| Inventive 24 | 25 | 25 | 1.90 | 1.09 |
| Inventive 25 | 50 | 25 | 1.93 | 1.01 |
| Inventive 26 | 80 | 25 | 1.94 | 0.99 |

As shown in Table 10 above, in the cases where the heating rate corresponded to the range of the present invention in the temperature range of 400°–700° C. (the inventive materials 24–26), the magnetic flux density $B_{10}$ was superior by showing over 1.90 Tesla, while the iron loss $W_{17/50}$ was very low by showing less than 1.09 W/kg.

However, in the case of the comparative materials 19 and 20, the secondary recrystallization itself was unstable, and therefore, there existed fine grains partially, with the result that the magnetic properties were inferior.

<EXAMPLE 14>

The basic composition system of steel was composed of in weight %: 0.029–0.036% of C, 3.01–3.17% of Si, 0.196–0.223% of Mn, 0.003–0.005% of S, 0.008–0.011% of N, 0.013–0.014% of P, 0.434–0.471% of Cu, and 0.091–0.0117% of Cr+Ni (the amount of Cr being 0.04%). Then the amount of soluble Al was varied into 6 levels as shown in Table 11.

Steel slabs composed of as shown in Table 11 below and having a thickness of 200 mm were prepared, and they were reheated at 1290° C. for 3.5 hours. Then the slabs were hot-rolled into a thickness of 2.3 mm, and then, without carrying out a hot rolled sheet annealing, and an pickling was carried out. Then a first cold rolling was carried out into a thickness of 0.60 mm, then a decarburization annealing was carried out at 850° C. under a humid atmosphere, and then, a final cold rolling was carried out into a thickness of 0.30 mm. Then an intermediate recovery annealing was carried out at 600° C., then MgO was coated, and then, a coiling was carried out into rolls. Then a finish annealing was carried out in such a manner that the heating was carried out under a 5% nitrogen containing hydrogen atmosphere, and after the heating, a soaking was carried out at 1200° C. for 20 hours. Then a cooling was carried out, thereby completing the manufacturing of a conventional oriented electrical steel sheet.

Then for the respective electrical steel sheets, the magnetic flux density $B_{10}$ and the iron loss $W_{17/50}$ were measured, and the measured results are shown in Table 12 below.

<EXAMPLE 15>

Steel slabs of a 200 mm thickness were prepared, and these steel slabs had the same composition as that of the inventive steel 5 of Table 11 of Example 14. These steel slabs were reheated to different temperatures, i.e., to 1225°, 1250°, 1275°, 1300°, 1320°, and 1350° C. At the respective temperatures, the steel slabs were soaked for 3 hours, and then, a hot rolling was carried out into a thickness of 2.3 mm. Then without carrying out a hot rolled sheet annealing, a first cold rolling was carried out into a thickness of 0.65 mm. Then a decarburization annealing was carried out at a temperature of 850° C. under a humid atmosphere, and a final cold rolling was carried out into a thickness of 0.30 mm. Then an intermediate annealing was carried out at 550° C., MgO was spread, and a final finish annealing was carried out. During the final finish annealing, the atmospheric gas during the temperature raising was a 5% nitrogen containing hydrogen gas, and the temperature raising rate was 30° C./hr. Then a soaking was carried out at 1200° C. for 20 hours under a 100% hydrogen atmosphere, and then, a cooling was carried out. Then the magnetic properties and the melting loss occurred on the surface during the initial reheating were checked, and the results are shown in Table 13 below.

TABLE 11

(Unit: weight %)

| composition steel | C | Si | P | N | S | Ni + Cr | Mn | Cu | Sol.Al |
| --- | --- | --- | --- | --- | --- | --- | --- | --- | --- |
| Comparative c | 0.032 | 3.13 | 0.013 | 0.008 | 0.005 | 0.091 | 0.025 | 0.457 | 0.003 |
| Comparative d | 0.033 | 3.01 | 0.014 | 0.011 | 0.004 | 0.104 | 0.214 | 0.468 | 0.005 |
| Inventive 4 | 0.036 | 3.09 | 0.014 | 0.010 | 0.005 | 0.099 | 0.223 | 0.471 | 0.007 |
| Inventive 5 | 0.031 | 3.17 | 0.013 | 0.009 | 0.004 | 0.117 | 0.219 | 0.460 | 0.010 |
| Inventive 6 | 0.029 | 3.12 | 0.013 | 0.011 | 0.005 | 0.106 | 0.198 | 0.463 | 0.012 |
| Comparative e | 0.032 | 3.16 | 0.013 | 0.010 | 0.003 | 0.105 | 0.196 | 0.439 | 0.015 |

TABLE 12

| Test specimen | Steel | Flux density $B_{10}$ (Tesla) | Iron loss $W_{17/50}$ (W/kg) |
| --- | --- | --- | --- |
| Comparative 21 | C. steel c | 1.78 | 1.53 |
| Comparative 22 | C. steel d | 1.80 | 1.35 |
| Inventive 27 | I. steel 4 | 1.83 | 1.25 |
| Inventive 28 | I. steel 5 | 1.85 | 1.22 |
| Inventive 29 | I. steel 6 | 1.87 | 1.19 |
| Comparative 23 | C. steel e | 1.81 | 1.34 |

As shown in Table 12 above, in the cases of the inventive materials 27–29 in which the starting steels were the inventive steels 4–6 whose soluble Al content is in the range of the present invention, the magnetic flux densities were superior by showing 1.83–1.87 Tesla, while the iron losses $W_{17/50}$ were low by showing 1.19–1.25 W/kg. On the other hand, in the cases of the comparative materials 21–22 in which the amounts of soluble Al were too low, and in the case of the comparative material 23 in which the amount of soluble Al was too high, the magnetic flux densities were too low, and the iron losses were too high.

TABLE 13

| Test specimen | Reheating temperature (°C.) | Magnetic properties Flux density $B_{10}$ (Tesla) | Iron loss $W_{17/50}$ (W/kg) | Melting loss (%) |
| --- | --- | --- | --- | --- |
| Comparative 24 | 1225 | 1.80 | 1.35 | 0 |
| Inventive 30 | 1250 | 1.85 | 1.21 | 0 |
| Inventive 31 | 1275 | 1.84 | 1.23 | 0 |
| Inventive 32 | 1300 | 1.87 | 1.19 | 0 |
| Inventive 33 | 1320 | 1.85 | 1.23 | 0.1 |
| Comparative 25 | 1350 | 1.86 | 1.20 | 1.8 |

As shown in Table 13 above, In the case where the reheating temperature departed from the range of the present invention as in the case of the comparative material 24, the magnetic flux density was low, and the iron loss was high, thereby showing inferior magnetic properties. On the other hand, in the case of the present invention in which the reheating temperature was over 1250° C., the magnetic flux density was improved to as high as 1.83 Tesla. Particularly, at the reheating temperatures of 1300° C. and 1320° C., the magnetic properties were most superior. However, in the case of the reheating temperature was too high, i.e., as high as 1350° C. which is the reheating temperative of the the comparative material 25, although the magnetic flux density was high, the slab surface was transited to a melting phase, thereby drastically increasing the melting loss.

Particularly, in the main temperature range of 1250°–1300° C. according to the present invention, there was no melting loss. Although the melting loss partly appeared at the reheating temperature of 1320° C., its amount was extremely small, and therefore, there was no problem in the actual yield and in the work efficiency.

<EXAMPLE 16>

Steel slabs of a 200 mm thickness were prepared by using the inventive steels 4–6 of Table 11 of Example 14. The steel slabs were reheated at 1290° C. for 3 hours, and then, a hot rolling was carried out into a thickness of 2.3 mm. Then without carrying out a hot rolled sheet annealing, a first cold rolling was carried out into a thickness of 0.65 mm. Then a decarburization annealing was carried out at 860° C. under a humid atmosphere, and then, a final cold rolling was carried out into a thickness of 0.30 mm. Then an intermediate recovery annealing was carried out at 600° C., then MgO was coated, and then, a finish annealing was carried out. In carrying out the finish annealing, during the temperature raising up to 1200° C., there were used different atmospheric gases of a 100% hydrogen gas, a 5% nitrogen containing hydrogen gas, a 10% nitrogen containing hydrogen gas, and a 25% nitrogen containing hydrogen gas. Upon attaining to 1200° C., a soaking was carried out for 20 hours under a 100% hydrogen atmosphere, and then, a cooling was carried out. Then the magnetic properties of the final product were measured, and the measured results are shown in Table 14 below.

Meanwhile, in the case where the inventive steel 5 was used as the starting material, the most superior magnetic properties were shown under a 5% nitrogen containing hydrogen atmosphere, and adequate magnetic properties were shown under a 100% hydrogen atmosphere and a 10% nitrogen containing hydrogen atmosphere. However, in the case where the treatment was carried out under the usual 25% nitrogen containing hydrogen atmosphere, the magnetic properties were degraded.

Meanwhile, in the case where the inventive steel 6 was used as the starting material, the most superior magnetic properties were shown under a 10% nitrogen containing hydrogen atmosphere, and adequate magnetic properties were shown under a 100% hydrogen atmosphere and a 5% nitrogen containing hydrogen atmosphere. However, under the usual 25% nitrogen containing hydrogen atmosphere, the magnetic properties were degraded.

<EXAMPLE 17>

Steel slabs of a 200 mm thickness were prepared by using the inventive steel 5 of Table 11 of Example 14. The steel slabs were reheated for 3 hours, and a hot rolling was carried out into a thickness of 2.3 mm. Then without carrying out a hot rolled sheet annealing, a first cold rolling was carried out into a thickness of 0.65 mm. Then a decarburization annealing was carried out at 850° C., and then, a final cold rolling was carried out into a thickness of 0.30 mm. Then skipping a second recovery annealing, an annealing separator containing MgO as the main ingredient was coated, and then, a coiling was carried out into rolls. Then a rapid heating was carried out up to 400° C., and then, further heating was made by applying variable heating rates, the variation range being 10°–100° C./hr. Then a heating was carried out further to 1200° C. at a fixed heating rate of 20° C./hr, and at the temperature of 1200° C., a soaking was carried out for 20

TABLE 14

| Test specimen | Atmospheric gas content during heating | | Magnetic properties | | Steel |
| --- | --- | --- | --- | --- | --- |
| | Nitrogen (%) | Hydrogen (%) | Flux density $B_{10}$ (Tesla) | Iron loss $W_{17/50}$ (W/kg) | |
| Inventive material 34 | 0 | 100 | 1.87 | 1.19 | Inventive steel 4 |
| Inventive material 35 | 5 | 95 | 1.85 | 1.21 | |
| Inventive material 36 | 10 | 90 | 1.84 | 1.23 | |
| Comparative material 26 | 25 | 75 | 1.80 | 1.32 | |
| Inventive material 37 | 0 | 100 | 1.85 | 1.23 | Inventive steel 5 |
| Inventive material 38 | 5 | 95 | 1.86 | 1.20 | |
| Inventive material 39 | 10 | 90 | 1.84 | 1.23 | |
| Comparative material 27 | 25 | 75 | 1.81 | 1.33 | |
| Inventive material 40 | 0 | 100 | 1.83 | 1.24 | Inventive steel 6 |
| Inventive material 41 | 5 | 95 | 1.84 | 1.22 | |
| Inventive material 42 | 10 | 90 | 1.87 | 1.20 | |
| Comparative material 28 | 25 | 75 | 1.85 | 1.29 | |

As shown in Table 14 above, in the case where the inventive steel 4 was used as the starting material, the most superior magnetic properties were shown under a 100% hydrogen atmosphere, and adequate magnetic properties were shown under a 10% nitrogen containing hydrogen atmosphere. However, in the case where the treatment was carried out under the usual 25% nitrogen containing hydrogen atmosphere, fine grains were dispersed, with the result that the magnetic properties were drastically degraded.

hours. Then a cooling was carried out, thereby completing the finish annealing. Here, the atmospheric gas was 25% nitrogen and 75% hydrogen during the heating, and otherwise, a 100% hydrogen atmosphere was used, thereby obtaining a conventional oriented electrical steel sheet. Then the magnetic flux density and the iron loss were measured, and the measured results are shown in Table 15 below.

TABLE 15

| Test specimen | heating rate (°C./hr) 400–700° C. | heating rate (°C./hr) 700–1200° C. | Magnetic properties Flux density $B_{10}$ (Tesla) | Magnetic properties Iron loss $W_{17/50}$ (W/kg) |
|---|---|---|---|---|
| Inventive 43 | 10 | 20 | 1.86 | 1.17 |
| Inventive 44 | 25 | 20 | 1.86 | 1.19 |
| Inventive 45 | 50 | 20 | 1.84 | 1.26 |
| Comparative 29 | 100 | 20 | 1.80 | 1.47 |

As shown in Table 15 above, the lower the initial heaing rate was, the more superior the magnetic properties. However, up to 50° C./hr which comes within the range of the present invention, the magnetic properties were adequate. However, above this rate, the secondary recrystallization became unstable, and fine grains appeared, with the result that the magnetic properties were drastically aggravated. Therefore, it was excluded from the range of the present invention.

According to the present invention as described above, the steel slab reheating temperature is lowered to the reheating temperature level for the general steel slab, and therefore, even after carrying out the secondary recrystallization stabilizing process, there can be obtained a magnetically superior oriented electrical steel sheet. Therefore, the oriented electrical steel sheet of the present invention can be usefully applied to transformers, electric motors, electric generators and other electric and electronic apparatuses.

What is claimed is:

1. A method for manufacturing an oriented electrical steel sheet based on a low temperature slab heating, comprising the steps of:

preparing a steel slab composed of in weight %: 0.035–0.050% of C, 2.9–3.3% of Si, less than 0.015% of P, 0.011–0.017% of soluble Al, 0.0080–0.012% of N, less than 0.007% of S, 0.06–0.18% of Ni and/or Cr, less than 0.32% of Mn, less than 0.6% of Cu, and balance of Fe and other inevitable impurities, said steel slab having an Mn/S weight ratio of more than 20.0, and having a Cu/Mn weight ratio of more than 1.5;

heating said steel slab to a temperature of 1250°–1320° C., to provide a heated steel slab;

hot rolling the heated steel slab to provide a hot rolled steel sheet;

cold rolling the hot rolled steel sheet in two stages into a final thickness, including the step of performing a decarburization annealing between the two stages of said cold rolling to provide a decarburized cold rolled steel sheet;

coating the decarburized cold rolled steel sheet with an annealing separator containing MgO as a main ingredient to provide a coated cold rolled steel sheet; and finish annealing said coated cold rolled steel sheet.

2. The method as claimed in claim 1, wherein:

a first cold rolling stage of the two-stage cold rolling is carried out on the hot rolled steel sheet to reduce its thickness to 0.60–0.75 mm;

the decarburization annealing is carried out at a temperature of 820°–870° C.;

a second cold rolling stage of said two-stage cold rolling is carried out to reduce the steel sheet to a final thickness;

conducting an intermediate recovery annealing treatment on said decarburized cold rolled steel sheet at a temperature of 500°–750° C. prior to the step of coating with an annealing separator; and wherein said finish annealing of said coated cold rolled steel sheet is carried out at a temperature of 1150°–1200° C. for at least 10 hours.

3. The method as claimed in claim 2, wherein said intermediate recovery annealing is carried out at a temperature of 600°–750° C. for 45 seconds to 2 minutes under a humid atmosphere having a $P_{H2O}/P_{H2}$ ratio of 0.62–0.88, whereby the formation of a glass film is improved.

4. A method for manufacturing an oriented electrical steel sheet based on a low temperature slab heating, comprising the steps of:

preparing a steel slab composed of in weight %: 0.020–0.050% of C, 2.9–3.3% of Si, less than 0.016% of P, 0.018–0.030% of soluble Al, 0.0080–0.012% of N, less than 0.007% of S, 0.06–0.18% of Ni and/or Cr, less than 0.32% of Mn, less than 0.6% of Cu, and balance of Fe and other inevitable impurities;

reheating said steel slab at a temperature of 1250°–1320° C., to provide a heated steel slab;

hot rolling the heated steel slab to provide a hot rolled sheet;

omitting an annealing treatment of said hot rolled sheet;

cold rolling the hot rolled sheet in two stages into a final thickness, including the step of performing an intermediate decarburization annealing carried out between the two stages of said cold rolling to provide a decarburized cold rolled sheet;

coating the decarburized cold rolled sheet with an annealing separator containing MgO as a main ingredient to provide a coated cold rolled sheet; and finish annealing said coated cold rolled sheet at a temperature of 1150°–1250° C., while maintaining a heating rate of at least 25° C./hr in a temperature range of 400°–700° C.

5. The method as claimed in claim 4, wherein the heating rate in the temperature range of 400°–700° C. is maintained below 50° C./hr during said finish annealing.

6. A method for manufacturing an oriented electrical steel sheet based on a low temperature slab heating, comprising the steps of:

preparing a steel slab composed of in weight %: 0.020–0.050% of C, 2.9–3.3% of Si, less than 0.016% of P, 0.007–0.012% of soluble Al, 0.0080–0.012% of N, less than 0.007% of S, 0.06–0.18% of Ni and/or Cr, less than 0.32% of Mn, less than 0.6% of Cu, and balance of Fe and other inevitable impurities;

reheating said steel slab at a temperature of 1250°–1320° C., to provide a heated steel slab;

hot rolling the heated steel slab to provide a hot rolled sheet;

omitting an annealing treatment of said hot rolled sheet;

cold rolling the hot rolled sheet in two stages into a final thickness, including the step of performing an intermediate decarburization annealing carried out between the two stages of said cold rolling to provide a decarburized cold rolled sheet;

conducting an intermediate recovery annealing treatment on said decarburized cold rolled sheet to provide an intermediate annealed cold rolled sheet, and coating said intermediate annealed cold rolled sheet with an annealing separator containing MgO as a main ingredient to provide a coated cold rolled sheet; and finish annealing said coated cold rolled sheet at a temperature of 1150°–1200° C. for at least 10 hours under a hydrogen containing atmosphere selected from the group consisting of a 100% hydrogen atmosphere and a hydrogen atmosphere containing up to 10% nitrogen.

7. The method as claimed in claim 1, wherein:

a first stage of the two-stage cold rolling is carried out on the hot rolled steel sheet to reduce its thickness to 0.60–0.75 mm;

the decarburization annealing is carried out at a temperature of 820°–870° C.;

a second stage of said two-stage cold rolling is carried out to reduce the steel sheet a final thickness; and wherein said finish annealing is carried out at a temperature of 1150°–1200° C. for 10 hours or more.

8. The method as claimed in claim 7, wherein a heating rate in a temperature range of 400–700° C. is maintained below 50° C./hr during said finish annealing.

9. The method as claimed in claim 7, wherein said finish annealing is carried out by maintaining a heating rate at 20° C./hr or over in a temperature range of 400°–700° C.

10. The method as claimed in claim 2, wherein the intermediate recovery annealing is carried out at a temperature of 500°–600° C.

11. A method for manufacturing an oriented electrical steel sheet based on a low temperature slab heating, comprising the steps of:

preparing a steel slab composed of in weight %: 0.020–0.050% of C, 2.9–3.3% of Si, less than 0.016% of P, 0.007–0.012% of soluble Al, 0.0080–0.012% of N, less than 0.007% of S, 0.06–0.18% of Ni and/or Cr, less than 0.32% of Mn, less than 0.6% of Cu, and balance of Fe and other inevitable impurities;

reheating said steel slab at a temperature of 1250°–1320° C., to provide a heated steel slab;

hot rolling the heated steel slab to provide a hot rolled sheet;

omitting an annealing treatment of said hot rolled sheet;

cold rolling the hot rolled sheet in two stages into a final thickness, including the step of performing an intermediate decarburization annealing carried out between the two stages of said cold rolling to provide an intermediate annealed cold rolled sheet and coating said intermediate annealed cold rolled sheet with an annealing separator containing MgO as a main ingredient to provide a coated cold rolled sheet; and finish annealing the coated cold rolled sheet at a temperature of 1150°–1200° for at least 10 hours under a hydrogen containing atmosphere selected from the group consisting of 100% hydrogen atmosphere and a hydrogen atmosphere containing up to 10% nitrogen while maintaining a heating rate of at least 25° C./hr in a temperature range of from 400°–700° C.

12. The method as claimed in claim 11, wherein the heating rate in the temperature range of 400°–700° C. is maintained below 50° C./hr during said finish annealing.

* * * * *

UNITED STATES PATENT AND TRADEMARK OFFICE
CERTIFICATE OF CORRECTION

PATENT NO. : 5,653,821
DATED : August 5, 1997
INVENTOR(S) : Gyu Seung Choi et al.

It is certified that error appears in the above-indentified patent and that said Letters Patent is hereby corrected as shown below:

Column 5 Line 57 "Therefore,," should read --Therefore,--.

Column 11 Line 1 "A" should read --Å--.

Column 12 Line 3 between "function" and "AlN" insert --to--.

Column 25 Line 54 "steele" should read --steel--.

Column 27 Line 60 "invention, .the" should read --invention, the--.

Column 29 Table 14 under Column heading "Flux density" last row, "1.85" should read --1.82--.

Column 29 Table 14 under Column heading "Flux density" row entitled "Comparative material 26", "1.32" should read --1.35--.

Signed and Sealed this

Second Day of December, 1997

BRUCE LEHMAN

*Attest:*

*Attesting Officer*          *Commissioner of Patents and Trademarks*